US011893189B2

(12) United States Patent
Bergström et al.

(10) Patent No.: US 11,893,189 B2
(45) Date of Patent: Feb. 6, 2024

(54) TOUCH-SENSING APPARATUS

(71) Applicant: Flatfrog Laboratories AB, Lund (SE)

(72) Inventors: Håkan Bergström, Torna-Hällestad (SE); Tomas Svensson, Limhamn (SE)

(73) Assignee: FlatFrog Laboratories AB, Lund (SE)

(*) Notice: Subject to any disclaimer, the term of this patent is extended or adjusted under 35 U.S.C. 154(b) by 0 days.

(21) Appl. No.: 17/759,836

(22) PCT Filed: Jan. 25, 2021

(86) PCT No.: PCT/SE2021/050040
§ 371 (c)(1),
(2) Date: Jul. 29, 2022

(87) PCT Pub. No.: WO2021/162602
PCT Pub. Date: Aug. 19, 2021

(65) Prior Publication Data
US 2023/0068643 A1 Mar. 2, 2023

(30) Foreign Application Priority Data

Feb. 10, 2020 (SE) .................................. 2030044-8
Nov. 9, 2020 (SE) .................................. 2030335-0

(51) Int. Cl.
G06F 3/042 (2006.01)
(52) U.S. Cl.
CPC .......... G06F 3/0428 (2013.01); G06F 3/0421 (2013.01); G06F 2203/04103 (2013.01)
(58) Field of Classification Search
CPC .................. G06F 3/0428; G06F 3/0421; G06F 2203/04103
See application file for complete search history.

(56) References Cited

U.S. PATENT DOCUMENTS 3,375,053 A * 3/1968 Ward .................... B60R 1/0605
D12/187
3,440,426 A 4/1969 Bush
(Continued)

FOREIGN PATENT DOCUMENTS

AU 2008 280 952 A1 3/2009
AU 2014201966 A1 4/2014
(Continued)

OTHER PUBLICATIONS

Machine translation of KR 10-2016-0075643 (Year: 2017).*
(Continued)

Primary Examiner — Patrick N Edouard
Assistant Examiner — Joseph P Fox
(74) Attorney, Agent, or Firm — Knobbe, Martens, Olson, & Bear, LLP

(57) ABSTRACT

A touch sensing apparatus is disclosed comprising a panel having a touch surface, emitters and detectors arranged along a perimeter, a light directing portion arranged adjacent the perimeter and comprising a light directing surface, the emitters and/or the detectors are arranged opposite a rear surface of the panel to emit and/or receive light through a channel in a frame element, the channel is arranged opposite the rear surface and extends in a direction of a normal axis of the touch surface, the light directing surface and the channel are arranged on opposite sides of the panel and overlap in the direction of the plane, the light directing surface receive light from the emitters, or direct light to the detectors, through the panel and through the channel, in the direction of the normal axis. A method of manufacturing a frame element for a touch sensing apparatus is disclosed.

23 Claims, 14 Drawing Sheets

(56) References Cited

U.S. PATENT DOCUMENTS

| | | | |
|---|---|---|---|
| 3,478,220 A | 11/1969 | Milroy | |
| 3,553,680 A | 1/1971 | Cooreman | |
| 3,673,327 A | 6/1972 | Johnson et al. | |
| 4,129,384 A | 12/1978 | Walker et al. | |
| 4,180,702 A | 12/1979 | Sick et al. | |
| 4,209,255 A | 6/1980 | Heynau et al. | |
| 4,213,707 A | 7/1980 | Evans, Jr. | |
| 4,254,333 A | 3/1981 | Bergström | |
| 4,254,407 A | 3/1981 | Tipon | |
| 4,294,543 A | 10/1981 | Apple et al. | |
| 4,346,376 A | 8/1982 | Mallos | |
| 4,420,261 A | 12/1983 | Barlow et al. | |
| 4,484,179 A | 11/1984 | Kasday | |
| 4,507,557 A | 3/1985 | Tsikos | |
| 4,521,112 A | 6/1985 | Kuwabara et al. | |
| 4,542,375 A | 9/1985 | Alles et al. | |
| 4,550,250 A | 10/1985 | Mueller et al. | |
| 4,593,191 A | 6/1986 | Alles | |
| 4,673,918 A | 6/1987 | Adler et al. | |
| 4,688,933 A | 8/1987 | Lapeyre | |
| 4,688,993 A | 8/1987 | Ferris et al. | |
| 4,692,809 A | 9/1987 | Beining et al. | |
| 4,710,760 A | 12/1987 | Kasday | |
| 4,736,191 A | 4/1988 | Matzke et al. | |
| 4,737,626 A | 4/1988 | Hasegawa | |
| 4,746,770 A | 5/1988 | McAvinney | |
| 4,751,379 A | 6/1988 | Sasaki et al. | |
| 4,752,655 A | 6/1988 | Tajiri et al. | |
| 4,766,424 A | 8/1988 | Adler et al. | |
| 4,772,763 A | 9/1988 | Garwin et al. | |
| 4,782,328 A | 11/1988 | Denlinger | |
| 4,812,833 A | 3/1989 | Shimauchi | |
| 4,837,430 A | 6/1989 | Hasegawa | |
| 4,868,550 A | 9/1989 | Hiroaki et al. | |
| 4,868,912 A | 9/1989 | Doering | |
| 4,891,829 A | 1/1990 | Deckman et al. | |
| 4,916,308 A * | 4/1990 | Meadows | G06F 3/0412 250/221 |
| 4,916,712 A | 4/1990 | Bender | |
| 4,933,544 A | 6/1990 | Tamaru | |
| 4,949,079 A | 8/1990 | Loebner | |
| 4,986,662 A | 1/1991 | Bures | |
| 4,988,983 A | 1/1991 | Wehrer | |
| 5,065,185 A | 11/1991 | Powers et al. | |
| 5,073,770 A | 12/1991 | Lowbner | |
| 5,105,186 A | 4/1992 | May | |
| 5,155,813 A | 10/1992 | Donoghue et al. | |
| 5,159,322 A | 10/1992 | Loebner | |
| 5,162,783 A | 11/1992 | Moreno | |
| 5,166,668 A | 11/1992 | Aoyagi | |
| 5,175,030 A | 12/1992 | Lu et al. | |
| 5,227,622 A | 7/1993 | Suzuki | |
| 5,248,856 A | 9/1993 | Mallicoat | |
| 5,254,407 A | 10/1993 | Sergerie et al. | |
| 5,345,490 A | 9/1994 | Finnigan et al. | |
| 5,383,022 A | 1/1995 | Kaser | |
| 5,414,413 A | 5/1995 | Tamaru et al. | |
| 5,434,373 A | 7/1995 | Komaki | |
| 5,483,261 A | 1/1996 | Yasutake | |
| 5,484,966 A | 1/1996 | Segen | |
| 5,499,098 A | 3/1996 | Ogawa | |
| 5,502,568 A | 3/1996 | Ogawa et al. | |
| 5,515,083 A | 5/1996 | Casebolt et al. | |
| 5,525,764 A | 6/1996 | Junkins et al. | |
| 5,526,422 A | 6/1996 | Keen | |
| 5,539,514 A | 7/1996 | Shishido et al. | |
| 5,570,181 A | 10/1996 | Yasuo et al. | |
| 5,572,251 A | 11/1996 | Ogawa | |
| 5,577,501 A | 11/1996 | Flohr et al. | |
| 5,600,105 A | 2/1997 | Fukuzaki et al. | |
| 5,608,550 A | 3/1997 | Epstein et al. | |
| 5,672,852 A | 9/1997 | Fukuzaki et al. | |
| 5,679,930 A | 10/1997 | Katsurahira | |
| 5,686,942 A | 11/1997 | Ball | |
| 5,688,933 A | 11/1997 | Evans et al. | |
| 5,729,249 A | 3/1998 | Yasutake | |
| 5,729,250 A | 3/1998 | Bishop et al. | |
| 5,736,686 A | 4/1998 | Perret, Jr. et al. | |
| 5,740,224 A | 4/1998 | Müller et al. | |
| 5,764,223 A | 6/1998 | Chang et al. | |
| 5,767,517 A | 6/1998 | Hawkins | |
| 5,775,792 A | 7/1998 | Wiese | |
| 5,945,980 A | 8/1999 | Moissev et al. | |
| 5,945,981 A | 8/1999 | Paull et al. | |
| 5,959,617 A | 9/1999 | Bird et al. | |
| 6,031,524 A | 2/2000 | Kunert | |
| 6,061,177 A | 5/2000 | Fujimoto | |
| 6,067,079 A | 5/2000 | Shieh | |
| 6,100,538 A | 8/2000 | Ogawa | |
| 6,122,394 A | 9/2000 | Neukermans et al. | |
| 6,141,104 A | 10/2000 | Schulz et al. | |
| 6,172,667 B1 | 1/2001 | Sayag | |
| 6,175,999 B1 | 1/2001 | Sloan et al. | |
| 6,227,667 B1 | 5/2001 | Halldorsson et al. | |
| 6,229,529 B1 | 5/2001 | Yano et al. | |
| 6,315,156 B1 | 11/2001 | Mahoney et al. | |
| 6,333,735 B1 | 12/2001 | Anvekar | |
| 6,340,967 B1 | 1/2002 | Maxted | |
| 6,366,276 B1 | 4/2002 | Kunimatsu et al. | |
| 6,380,732 B1 | 4/2002 | Gilboa | |
| 6,380,740 B1 | 4/2002 | Laub | |
| 6,390,370 B1 | 5/2002 | Plesko | |
| 6,429,857 B1 | 8/2002 | Masters et al. | |
| 6,452,996 B1 | 9/2002 | Hsieh | |
| 6,476,797 B1 | 11/2002 | Kurihara et al. | |
| 6,492,633 B2 | 12/2002 | Nakazawa et al. | |
| 6,495,832 B1 | 12/2002 | Kirby | |
| 6,504,143 B2 | 1/2003 | Koops et al. | |
| 6,504,530 B1 | 1/2003 | Wilson et al. | |
| 6,529,327 B1 | 3/2003 | Graindorge | |
| 6,535,213 B1 | 3/2003 | Ogino et al. | |
| 6,538,644 B1 | 3/2003 | Muraoka | |
| 6,587,099 B2 | 7/2003 | Takekawa | |
| 6,648,485 B1 | 11/2003 | Colgan et al. | |
| 6,660,964 B1 | 12/2003 | Benderly | |
| 6,664,498 B2 | 12/2003 | Forsman et al. | |
| 6,664,952 B2 | 12/2003 | Iwamoto et al. | |
| 6,677,934 B1 | 1/2004 | Blanchard | |
| 6,690,363 B2 | 2/2004 | Newton | |
| 6,692,807 B2 | 2/2004 | Bries et al. | |
| 6,707,027 B2 | 3/2004 | Liess et al. | |
| 6,710,767 B1 | 3/2004 | Hasegawa et al. | |
| 6,738,051 B2 | 5/2004 | Boyd et al. | |
| 6,748,098 B1 | 6/2004 | Rosenfeld | |
| 6,784,948 B2 | 8/2004 | Kawashima et al. | |
| 6,799,141 B1 | 9/2004 | Stoustrup et al. | |
| 6,803,900 B1 | 10/2004 | Berkoff et al. | |
| 6,806,871 B1 | 10/2004 | Yasue | |
| 6,911,646 B1 | 6/2005 | Weitekamp | |
| 6,927,384 B2 | 8/2005 | Reime et al. | |
| 6,940,286 B2 | 9/2005 | Wang et al. | |
| 6,965,836 B2 | 11/2005 | Richardson | |
| 6,972,401 B2 | 12/2005 | Akitt et al. | |
| 6,972,753 B1 | 12/2005 | Kimura et al. | |
| 6,985,137 B2 | 1/2006 | Kaikuranta | |
| 7,042,444 B2 | 5/2006 | Cok | |
| 7,084,859 B1 | 8/2006 | Pryor | |
| 7,087,907 B1 | 8/2006 | Lalovic et al. | |
| 7,117,157 B1 | 10/2006 | Taylor et al. | |
| 7,133,031 B2 | 11/2006 | Wang et al. | |
| 7,151,530 B2 | 12/2006 | Roeber et al. | |
| 7,176,904 B2 | 2/2007 | Satoh | |
| 7,199,932 B2 | 4/2007 | Sugiura | |
| 7,359,041 B2 | 4/2008 | Xie et al. | |
| 7,397,418 B1 | 7/2008 | Doerry et al. | |
| 7,432,893 B2 | 10/2008 | Ma et al. | |
| 7,435,940 B2 | 10/2008 | Eliasson et al. | |
| 7,436,443 B2 | 10/2008 | Hirunuma et al. | |
| 7,442,914 B2 | 10/2008 | Eliasson et al. | |
| 7,465,914 B2 | 12/2008 | Eliasson et al. | |
| 7,528,898 B2 | 5/2009 | Hashimoto | |
| D602,498 S | 10/2009 | Arnell | |
| 7,613,375 B2 | 11/2009 | Shimizu | |
| 7,629,968 B2 | 12/2009 | Miller et al. | |

(56) References Cited

U.S. PATENT DOCUMENTS

| | | |
|---|---|---|
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,712,041 B2 | 5/2010 | Toyama et al. |
| 7,729,056 B2 | 6/2010 | Hwang et al. |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |
| 8,094,910 B2 | 1/2012 | Xu |
| 8,139,046 B2 | 3/2012 | Kweon et al. |
| 8,149,211 B2 | 4/2012 | Hayakawa et al. |
| 8,149,221 B2 | 4/2012 | Newton |
| 8,184,108 B2 | 5/2012 | Smits |
| 8,217,854 B2 | 7/2012 | Bhogal et al. |
| 8,218,154 B2 | 7/2012 | Østergaard et al. |
| 8,274,495 B2 | 9/2012 | Lee |
| D669,497 S | 10/2012 | Lee et al. |
| 8,314,773 B2 | 11/2012 | Low et al. |
| 8,319,729 B2 | 11/2012 | Choi et al. |
| 8,325,158 B2 | 12/2012 | Yatsuda et al. |
| 8,339,379 B2 | 12/2012 | Goertz et al. |
| 8,350,827 B2 | 1/2013 | Chung et al. |
| D675,644 S | 2/2013 | Frost et al. |
| 8,384,010 B2 | 2/2013 | Hong et al. |
| 8,384,693 B2 | 2/2013 | Newton |
| 8,407,606 B1 | 3/2013 | Davidson et al. |
| 8,436,833 B2 | 5/2013 | King et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,553,014 B2 | 10/2013 | Holmgren et al. |
| 8,567,257 B2 | 10/2013 | Van Steenberge et al. |
| 8,571,171 B2 | 10/2013 | Tischecnko et al. |
| 8,581,884 B2 | 11/2013 | Fåhraeus et al. |
| 8,599,140 B2 | 12/2013 | Crockett et al. |
| 8,610,672 B2 | 12/2013 | Kun et al. |
| 8,624,858 B2 | 1/2014 | Fyke et al. |
| 8,686,974 B2 | 4/2014 | Christiansson et al. |
| 8,692,807 B2 | 4/2014 | Føhraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,780,066 B2 | 7/2014 | Christiansson et al. |
| 8,830,181 B1 | 9/2014 | Clark et al. |
| 8,860,696 B2 | 10/2014 | Wassvik et al. |
| 8,872,098 B2 | 10/2014 | Bergström et al. |
| 8,872,801 B2 | 10/2014 | Bergström et al. |
| D716,820 S | 11/2014 | Wood |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,902,196 B2 | 12/2014 | Goertz et al. |
| 8,913,035 B2 | 12/2014 | Lai et al. |
| 8,928,590 B1 | 1/2015 | El Dokor |
| 8,963,886 B2 | 2/2015 | Wassvik |
| 8,982,084 B2 | 3/2015 | Christiansson et al. |
| 9,001,086 B1 | 4/2015 | Saini |
| 9,024,896 B2 | 5/2015 | Chen |
| 9,024,916 B2 | 5/2015 | Christiansson |
| 9,035,909 B2 | 5/2015 | Christiansson |
| 9,052,771 B2 | 6/2015 | Goertz et al. |
| 9,063,614 B2 | 6/2015 | Petterson et al. |
| 9,063,617 B2 | 6/2015 | Eliasson et al. |
| 9,086,763 B2 | 7/2015 | Johansson et al. |
| 9,092,091 B2 | 7/2015 | Piot et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,158,416 B2 | 10/2015 | Eriksson et al. |
| 9,164,625 B2 | 10/2015 | Holmgren et al. |
| 9,195,344 B2 | 11/2015 | Goertz et al. |
| 9,201,520 B2 | 12/2015 | Benko et al. |
| 9,207,800 B1 | 12/2015 | Eriksson et al. |
| 9,213,443 B2 | 12/2015 | Goertz et al. |
| 9,213,445 B2 | 12/2015 | King et al. |
| 9,223,441 B1 | 12/2015 | Bohn |
| 9,274,645 B2 | 3/2016 | Christiansson et al. |
| 9,280,237 B2 | 3/2016 | Kukulj |
| 9,291,845 B2 | 3/2016 | Shin et al. |
| 9,292,132 B2 | 3/2016 | An et al. |
| 9,317,146 B1 | 4/2016 | Hufnagel |
| 9,317,168 B2 | 4/2016 | Christiansson et al. |
| 9,323,396 B2 | 4/2016 | Han et al. |
| 9,366,565 B2 | 6/2016 | Uvnäs |
| 9,366,802 B2 | 6/2016 | Lee et al. |
| 9,377,884 B2 | 6/2016 | Christiansson et al. |
| 9,389,730 B2 | 7/2016 | Goertz et al. |
| 9,389,732 B2 | 7/2016 | Craven-Bartle |
| 9,411,430 B2 | 8/2016 | Holmgren et al. |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| D768,674 S | 10/2016 | Hanover |
| 9,471,170 B2 | 10/2016 | Goertz et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,563,298 B2 | 2/2017 | Sakashita et al. |
| D782,516 S | 3/2017 | Hohne et al. |
| 9,588,619 B2 | 3/2017 | Christiansson et al. |
| 9,594,467 B2 | 3/2017 | Christiansson et al. |
| D783,042 S | 4/2017 | Kim et al. |
| 9,618,682 B2 | 4/2017 | Yoon et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,645,679 B2 | 5/2017 | Eriksson et al. |
| 9,652,082 B1 | 5/2017 | Lin et al. |
| 9,671,900 B2 | 6/2017 | Piot et al. |
| 9,678,601 B2 | 6/2017 | Petterson et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 9,741,184 B2 | 8/2017 | Iyer et al. |
| D798,893 S | 10/2017 | Anzures et al. |
| 9,785,287 B2 | 10/2017 | Bergström et al. |
| 9,811,163 B2 | 11/2017 | Eriksson et al. |
| D807,388 S | 1/2018 | Butcher et al. |
| D808,416 S | 1/2018 | Anzures et al. |
| 9,857,916 B2 | 1/2018 | Bergstrom et al. |
| 9,857,917 B2 | 1/2018 | Wassvik et al. |
| 9,874,978 B2 | 1/2018 | Wall |
| 9,921,661 B2 | 3/2018 | Eriksson et al. |
| 9,983,626 B2 | 5/2018 | Cao et al. |
| 9,983,717 B2 | 5/2018 | Pacheco et al. |
| 9,996,196 B2 | 6/2018 | Christiansson et al. |
| 10,001,881 B2 | 6/2018 | Wallander et al. |
| 10,004,985 B2 | 6/2018 | Holmgren et al. |
| D824,412 S | 7/2018 | Anzures et al. |
| 10,013,107 B2 | 7/2018 | Christiansson et al. |
| 10,019,113 B2 | 7/2018 | Christiansson et al. |
| 10,024,741 B2 | 7/2018 | Povazy et al. |
| 10,031,623 B2 | 7/2018 | Christiansson et al. |
| 10,048,773 B2 | 8/2018 | Fahraeus et al. |
| 10,088,919 B2 | 10/2018 | Tamura et al. |
| 10,126,882 B2 | 11/2018 | Wassvik |
| 10,126,897 B2 | 11/2018 | Kwon et al. |
| 10,146,376 B2 | 12/2018 | Wassvik et al. |
| 10,151,866 B2 | 12/2018 | Craven-Bartle et al. |
| 10,152,176 B2 | 12/2018 | Wallander et al. |
| 10,161,886 B2 | 12/2018 | Ohlsson et al. |

(56) References Cited

U.S. PATENT DOCUMENTS

| | | |
|---|---|---|
| D837,829 S | 1/2019 | Balles et al. |
| D838,280 S | 1/2019 | Coburn et al. |
| 10,168,835 B2 | 1/2019 | Wallander et al. |
| D842,312 S | 3/2019 | Na et al. |
| 10,268,319 B2 | 4/2019 | Wassvik et al. |
| 10,282,035 B2 | 5/2019 | Kocovksi et al. |
| 10,317,200 B1 | 6/2019 | Han et al. |
| 10,318,041 B2 | 6/2019 | Bjorklund et al. |
| 10,318,074 B2 | 6/2019 | Klinghult et al. |
| 10,324,565 B2 | 6/2019 | Rosengren et al. |
| 10,324,566 B2 | 6/2019 | Christiansson |
| D852,842 S | 7/2019 | Hung et al. |
| 10,365,768 B2 | 7/2019 | Craven-Bartle et al. |
| 10,372,265 B2 | 8/2019 | Christiansson et al. |
| 10,397,638 B2 | 8/2019 | Kanematsu et al. |
| 10,401,546 B2 | 9/2019 | Craven-Bartle et al. |
| 10,417,219 B1 | 9/2019 | Yang et al. |
| 10,437,358 B2 | 10/2019 | Geaghan et al. |
| 10,437,389 B2 | 10/2019 | Skagmo et al. |
| 10,459,589 B2 | 10/2019 | Xu et al. |
| 10,474,249 B2 | 11/2019 | Fahraeus et al. |
| 10,481,737 B2 | 11/2019 | Christiansson et al. |
| 10,496,227 B2 | 12/2019 | Wassvik et al. |
| 10,579,227 B1 | 3/2020 | Bura et al. |
| 10,606,414 B2 | 3/2020 | Christiansson et al. |
| 10,606,416 B2 | 3/2020 | Skagmo et al. |
| 10,642,386 B2 | 5/2020 | Makelainen et al. |
| 10,649,585 B1 | 5/2020 | van Beek et al. |
| 10,691,638 B1 | 6/2020 | Lyadvinsky et al. |
| D892,855 S | 8/2020 | Liu et al. |
| 10,739,916 B2 | 8/2020 | Skagmo et al. |
| 10,761,657 B2 | 9/2020 | Christiansson et al. |
| 10,775,937 B2 | 9/2020 | Christiansson et al. |
| 10,845,923 B2 | 11/2020 | Skagmo et al. |
| 10,853,315 B1 | 12/2020 | Faibish et al. |
| 10,860,142 B1 | 12/2020 | Northcott et al. |
| 10,884,275 B2 | 1/2021 | Yang et al. |
| 10,884,553 B2 | 1/2021 | Weilbacher et al. |
| 10,963,104 B2 | 3/2021 | Bergstrom et al. |
| 11,016,605 B2 | 5/2021 | Christiansson et al. |
| 11,029,783 B2 | 6/2021 | Wassvik et al. |
| 11,099,688 B2 | 8/2021 | Christiansson et al. |
| 11,106,312 B2 | 8/2021 | Christiansson et al. |
| 11,106,314 B2 | 8/2021 | Krishnakumar et al. |
| 11,119,565 B2 | 9/2021 | Avila et al. |
| 11,175,756 B2 | 11/2021 | Andersson et al. |
| 11,182,023 B2 | 11/2021 | Ohlsson et al. |
| 11,243,640 B2 | 2/2022 | Ancona et al. |
| 11,256,371 B2 | 2/2022 | Bergstrom et al. |
| 11,263,028 B2 | 3/2022 | Momchilov |
| 11,281,335 B2 | 3/2022 | Kocovski et al. |
| 11,281,338 B2 | 3/2022 | Skagmo et al. |
| 11,301,089 B2 | 4/2022 | Christiansson et al. |
| 11,474,644 B2 | 10/2022 | Bergstrom et al. |
| 11,567,610 B2 | 1/2023 | Bergstrom et al. |
| 11,579,731 B2 | 2/2023 | Kocovski et al. |
| 11,650,699 B2 | 5/2023 | Bergstrom et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2001/0055411 A1 | 12/2001 | Black |
| 2002/0067348 A1 | 6/2002 | Masters et al. |
| 2002/0075243 A1 | 6/2002 | Newton |
| 2002/0085003 A1 | 7/2002 | Nagashima |
| 2002/0118177 A1 | 8/2002 | Newton |
| 2002/0130883 A1 | 9/2002 | Hunag et al. |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0109664 A1 | 6/2004 | Ohtsuki et al. |
| 2004/0130338 A1 | 7/2004 | Wang et al. |
| 2004/0134772 A1 | 7/2004 | Cohen et al. |
| 2004/0136564 A1 | 7/2004 | Roeber et al. |
| 2004/0174541 A1 | 9/2004 | Freifeld |
| 2004/0179001 A1 | 9/2004 | Morrison et al. |
| 2004/0201579 A1 | 10/2004 | Graham |
| 2004/0212603 A1* | 10/2004 | Cok .................. G06F 3/0421 |
| | | 345/175 |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0022130 A1 | 1/2005 | Fabritius |
| 2005/0024624 A1 | 2/2005 | Gruhlke et al. |
| 2005/0041013 A1 | 2/2005 | Tanaka |
| 2005/0005319 A1 | 3/2005 | Gohno et al. |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0168134 A1 | 8/2005 | Nishikawa |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0248848 A1 | 11/2005 | Whitehead et al. |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0013353 A1 | 1/2006 | Hein |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0061861 A1 | 3/2006 | Munro et al. |
| 2006/0098004 A1 | 5/2006 | Cok |
| 2006/0114237 A1 | 6/2006 | Crockett et al. |
| 2006/0132454 A1 | 6/2006 | Chen et al. |
| 2006/0139340 A1 | 6/2006 | Geaghan |
| 2006/0144237 A1 | 7/2006 | Liang et al. |
| 2006/0158437 A1 | 7/2006 | Blythe et al. |
| 2006/0161871 A1 | 7/2006 | Hotelling et al. |
| 2006/0170658 A1 | 8/2006 | Nakamura et al. |
| 2006/0182345 A1 | 8/2006 | Geidl et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0083575 A1 | 4/2007 | Leung et al. |
| 2007/0120833 A1 | 5/2007 | Yamaguchi et al. |

(56) References Cited

U.S. PATENT DOCUMENTS

| | | |
|---|---|---|
| 2007/0125937 A1 | 6/2007 | Eliasson et al. |
| 2007/0152985 A1 | 7/2007 | Ostergaard et al. |
| 2007/0165008 A1 | 7/2007 | Crockett |
| 2007/0176162 A1 | 8/2007 | Kang |
| 2007/0195404 A1 | 8/2007 | Iijima |
| 2007/0201042 A1 | 8/2007 | Eliasson et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0012835 A1 | 1/2008 | Rimon et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0074402 A1 | 3/2008 | Cornish et al. |
| 2008/0080811 A1 | 4/2008 | Deane |
| 2008/0088603 A1 | 4/2008 | Eliasson et al. |
| 2008/0115081 A1 | 5/2008 | Sankaravadivelu et al. |
| 2008/0121442 A1 | 5/2008 | Boer et al. |
| 2008/0122792 A1 | 5/2008 | Izadi et al. |
| 2008/0122803 A1 | 5/2008 | Izadi et al. |
| 2008/0130979 A1 | 6/2008 | Run et al. |
| 2008/0133265 A1 | 6/2008 | Silkaitis et al. |
| 2008/0150846 A1 | 6/2008 | Chung et al. |
| 2008/0150848 A1 | 6/2008 | Chung et al. |
| 2008/0151126 A1 | 6/2008 | Yu |
| 2008/0158176 A1 | 7/2008 | Land et al. |
| 2008/0180404 A1 | 7/2008 | Han et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0246388 A1 | 10/2008 | Cheon et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0285406 A1 | 11/2008 | Kukulji et al. |
| 2008/0291668 A1 | 11/2008 | Aylward et al. |
| 2008/0297482 A1 | 12/2008 | Weiss |
| 2008/0309626 A1 | 12/2008 | Westernman et al. |
| 2009/0000831 A1 | 1/2009 | Miller et al. |
| 2009/0002340 A1 | 1/2009 | Van Genechten |
| 2009/0006292 A1 | 1/2009 | Block |
| 2009/0040786 A1 | 2/2009 | Mori |
| 2009/0058832 A1 | 3/2009 | Newton |
| 2009/0058833 A1 | 3/2009 | Newton |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0100383 A1 | 4/2009 | Sunday et al. |
| 2009/0115919 A1 | 5/2009 | Tanaka et al. |
| 2009/0122020 A1 | 5/2009 | Eliasson et al. |
| 2009/0122027 A1 | 5/2009 | Newton |
| 2009/0128499 A1 | 5/2009 | Izadi et al. |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0174679 A1 | 7/2009 | Westerman |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1 | 7/2009 | Goertz et al. |
| 2009/0209420 A1 | 8/2009 | Kalgutkar et al. |
| 2009/0219256 A1 | 9/2009 | Newton |
| 2009/0229892 A1 | 9/2009 | Fisher et al. |
| 2009/0251439 A1 | 10/2009 | Westerman et al. |
| 2009/0254869 A1 | 10/2009 | Ludwig et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0273795 A1 | 11/2009 | Hansen et al. |
| 2009/0278816 A1 | 11/2009 | Colson |
| 2009/0278913 A1 | 11/2009 | Rosenfeld et al. |
| 2009/0295752 A1 | 12/2009 | Liu et al. |
| 2009/0297009 A1 | 12/2009 | Xu et al. |
| 2010/0026667 A1 | 2/2010 | Bernstein |
| 2010/0033444 A1 | 2/2010 | Kobayashi |
| 2010/0045629 A1 | 2/2010 | Newton |
| 2010/0045634 A1 | 2/2010 | Su et al. |
| 2010/0007331 A1 | 3/2010 | Hu et al. |
| 2010/0059295 A1 | 3/2010 | Hotelling et al. |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0073327 A1 | 3/2010 | Mau et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0103133 A1 | 4/2010 | Park et al. |
| 2010/0125438 A1 | 5/2010 | Audet |
| 2010/0127975 A1 | 5/2010 | Jensen |
| 2010/0130257 A1 | 5/2010 | Jang et al. |
| 2010/0130280 A1 | 5/2010 | Arezina et al. |
| 2010/0134435 A1 | 6/2010 | Kimura et al. |
| 2010/0141604 A1 | 6/2010 | Cai et al. |
| 2010/0142823 A1 | 6/2010 | Wang et al. |
| 2010/0166276 A1 | 7/2010 | Dube et al. |
| 2010/0176732 A1 | 7/2010 | Schenk et al. |
| 2010/0187422 A1 | 7/2010 | Kothari et al. |
| 2010/0189376 A1 | 7/2010 | Bertram et al. |
| 2010/0193259 A1 | 8/2010 | Wassvik |
| 2010/0195804 A1 | 8/2010 | Dafni et al. |
| 2010/0207874 A1 | 8/2010 | Yuxin et al. |
| 2010/0229091 A1 | 9/2010 | Homma et al. |
| 2010/0238139 A1 | 9/2010 | Goertz et al. |
| 2010/0238686 A1 | 9/2010 | Weber et al. |
| 2010/0245292 A1 | 9/2010 | Wu |
| 2010/0259939 A1 | 10/2010 | Chen et al. |
| 2010/0265170 A1 | 10/2010 | Norieda |
| 2010/0277436 A1 | 11/2010 | Feng et al. |
| 2010/0277728 A1 | 11/2010 | Imura |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0309139 A1 | 12/2010 | Ng |
| 2010/0315379 A1 | 12/2010 | Allard et al. |
| 2010/0321328 A1 | 12/2010 | Chang et al. |
| 2010/0322550 A1 | 12/2010 | Trott |
| 2010/0325547 A1 | 12/2010 | Keng et al. |
| 2010/0328265 A1 | 12/2010 | Hotelling et al. |
| 2011/0007021 A1 | 1/2011 | Bernstein et al. |
| 2011/0037735 A1 | 2/2011 | Land et al. |
| 2011/0043490 A1 | 2/2011 | Powell et al. |
| 2011/0049388 A1 | 3/2011 | Delaney et al. |
| 2011/0050576 A1 | 3/2011 | Forutanpour et al. |
| 2011/0050649 A1 | 3/2011 | Newton et al. |
| 2011/0051394 A1 | 3/2011 | Bailey |
| 2011/0057102 A1 | 3/2011 | Yao |
| 2011/0065424 A1 | 3/2011 | Estevez |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074725 A1 | 3/2011 | Westerman et al. |
| 2011/0074734 A1 | 3/2011 | Wassvik et al. |

(56) References Cited

U.S. PATENT DOCUMENTS

| | | |
|---|---|---|
| 2011/0074735 A1 | 3/2011 | Wassvik et al. |
| 2011/0080361 A1 | 4/2011 | Miller et al. |
| 2011/0084939 A1 | 4/2011 | Gepner et al. |
| 2011/0090176 A1 | 4/2011 | Christiansson et al. |
| 2011/0102320 A1 | 5/2011 | Hauke et al. |
| 2011/0102374 A1 | 5/2011 | Wassvik et al. |
| 2011/0102538 A1 | 5/2011 | Tan |
| 2011/0115748 A1 | 5/2011 | Xu |
| 2011/0121323 A1 | 5/2011 | Wu et al. |
| 2011/0122075 A1 | 5/2011 | Seo et al. |
| 2011/0122091 A1 | 5/2011 | King et al. |
| 2011/0122094 A1 | 5/2011 | Tsang et al. |
| 2011/0134079 A1 | 6/2011 | Stark |
| 2011/0140106 A1 | 6/2011 | Forbes |
| 2011/0141062 A1 | 6/2011 | Yu et al. |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169756 A1 | 7/2011 | Ogawa et al. |
| 2011/0169780 A1 | 7/2011 | Goertz et al. |
| 2011/0175852 A1 | 7/2011 | Goertz et al. |
| 2011/0181552 A1 | 7/2011 | Magnus et al. |
| 2011/0199297 A1 | 8/2011 | Antonyuk et al. |
| 2011/0205186 A1 | 8/2011 | Newton et al. |
| 2011/0205189 A1 | 8/2011 | Newton |
| 2011/0205750 A1 | 8/2011 | Krijin et al. |
| 2011/0210946 A1 | 9/2011 | Goertz et al. |
| 2011/0216042 A1 | 9/2011 | Wassvik et al. |
| 2011/0220794 A1 | 9/2011 | Censor et al. |
| 2011/0221705 A1 | 9/2011 | Yi et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0254864 A1 | 10/2011 | Tsuchikawa et al. |
| 2011/0255305 A1 | 10/2011 | Chen et al. |
| 2011/0260829 A1 | 10/2011 | Lee |
| 2011/0261020 A1 | 10/2011 | Song et al. |
| 2011/0266423 A1 | 11/2011 | Koeppe et al. |
| 2011/0267296 A1 | 11/2011 | Noguchi et al. |
| 2011/0291944 A1 | 12/2011 | Simmons et al. |
| 2011/0291988 A1 | 12/2011 | Bamji et al. |
| 2011/0291989 A1 | 12/2011 | Lee |
| 2011/0298743 A1 | 12/2011 | Machida et al. |
| 2011/0309325 A1 | 12/2011 | Park et al. |
| 2011/0310045 A1 | 12/2011 | Toda et al. |
| 2011/0316005 A1 | 12/2011 | Murao et al. |
| 2012/0007835 A1 | 1/2012 | Yu-Jen et al. |
| 2012/0017182 A1 | 1/2012 | Bau |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0044572 A1 | 2/2012 | Simmonds et al. |
| 2012/0045170 A1 | 2/2012 | Shibata et al. |
| 2012/0050336 A1 | 3/2012 | Nave et al. |
| 2012/0056081 A1 | 3/2012 | Kozodoy |
| 2012/0056807 A1 | 3/2012 | Chapman et al. |
| 2012/0056814 A1 | 3/2012 | Sudo |
| 2012/0062474 A1 | 3/2012 | Weishaupt et al. |
| 2012/0062489 A1 | 3/2012 | Andersson et al. |
| 2012/0062492 A1 | 3/2012 | Katoh |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0096383 A1 | 4/2012 | Sakamoto et al. |
| 2012/0098733 A1 | 4/2012 | Masuda et al. |
| 2012/0110447 A1 | 5/2012 | Chen |
| 2012/0131490 A1 | 5/2012 | Lin et al. |
| 2012/0141001 A1 | 6/2012 | Zhang et al. |
| 2012/0146930 A1 | 6/2012 | Lee |
| 2012/0146950 A1 | 6/2012 | Park et al. |
| 2012/0153134 A1 | 6/2012 | Bergström et al. |
| 2012/0154338 A1 | 6/2012 | Bergström et al. |
| 2012/0154339 A1 | 6/2012 | Land et al. |
| 2012/0162142 A1 | 6/2012 | Christiansson et al. |
| 2012/0162144 A1 | 6/2012 | Fåhraeus et al. |
| 2012/0169672 A1 | 7/2012 | Christiansson |
| 2012/0170056 A1 | 7/2012 | Jakobsen et al. |
| 2012/0176343 A1 | 7/2012 | Holmgren et al. |
| 2012/0181419 A1 | 7/2012 | Momtahan |
| 2012/0182266 A1 | 7/2012 | Han |
| 2012/0188205 A1 | 7/2012 | Jansson et al. |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0206375 A1 | 8/2012 | Fyke et al. |
| 2012/0212441 A1 | 8/2012 | Christiansson et al. |
| 2012/0212457 A1 | 8/2012 | Drumm |
| 2012/0217882 A1 | 8/2012 | Wong et al. |
| 2012/0218200 A1 | 8/2012 | Glazer et al. |
| 2012/0218229 A1 | 8/2012 | Drumm |
| 2012/0221715 A1 | 8/2012 | Hamada |
| 2012/0223916 A1 | 9/2012 | Kukulj |
| 2012/0235892 A1 | 9/2012 | Nerendra et al. |
| 2012/0242622 A1 | 9/2012 | Tseng et al. |
| 2012/0249478 A1 | 10/2012 | Chang et al. |
| 2012/0249485 A1 | 10/2012 | Ye et al. |
| 2012/0256882 A1 | 10/2012 | Christiansson et al. |
| 2012/0257004 A1 | 10/2012 | Smith et al. |
| 2012/0262407 A1 | 10/2012 | Hinckley et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0274583 A1 | 11/2012 | Haggerty et al. |
| 2012/0299852 A1 | 11/2012 | Hsu et al. |
| 2012/0305755 A1 | 12/2012 | Hong et al. |
| 2012/0313865 A1 | 12/2012 | Pearce |
| 2013/0002536 A1 | 1/2013 | Yoshida et al. |
| 2013/0007579 A1 | 1/2013 | Dancy et al. |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0055080 A1 | 2/2013 | Komer et al. |
| 2013/0055143 A1 | 2/2013 | Martin et al. |
| 2013/0076697 A1 | 3/2013 | Goertz et al. |
| 2013/0082980 A1 | 4/2013 | Gruhlke et al. |
| 2013/0093838 A1 | 4/2013 | Tan et al. |
| 2013/0106709 A1 | 5/2013 | Simmons |
| 2013/0107569 A1 | 5/2013 | Suganuma |
| 2013/0113715 A1 | 5/2013 | Grant et al. |
| 2013/0120274 A1 | 5/2013 | Ha et al. |
| 2013/0120320 A1 | 5/2013 | Liu et al. |
| 2013/0120324 A1 | 5/2013 | Diverdi et al. |
| 2013/0125016 A1 | 5/2013 | Pallakoff et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0136304 A1 | 5/2013 | Anabuki et al. |
| 2013/0141388 A1 | 6/2013 | Ludwig et al. |
| 2013/0141395 A1 | 6/2013 | Holmgren et al. |
| 2013/0154983 A1 | 6/2013 | Christiansson et al. |
| 2013/0155027 A1 | 6/2013 | Holmgren et al. |
| 2013/0155655 A1 | 6/2013 | Lee et al. |
| 2013/0155723 A1 | 6/2013 | Coleman |
| 2013/0158504 A1 | 6/2013 | Ruchti et al. |
| 2013/0181896 A1 | 7/2013 | Gruhlke et al. |
| 2013/0181908 A1 | 7/2013 | Santiago et al. |
| 2013/0181953 A1 | 7/2013 | Hinckley et al. |
| 2013/0187891 A1 | 7/2013 | Eriksson et al. |
| 2013/0201142 A1 | 8/2013 | Suarez Rovere |
| 2013/0208506 A1 | 8/2013 | Ye et al. |
| 2013/0222344 A1 | 8/2013 | Lu et al. |
| 2013/0222346 A1 | 8/2013 | Chen et al. |
| 2013/0229357 A1 | 9/2013 | Powell et al. |
| 2013/0234991 A1 | 9/2013 | Sparf |
| 2013/0241886 A1 | 9/2013 | Eriksson et al. |
| 2013/0241887 A1 | 9/2013 | Sharma |
| 2013/0249833 A1 | 9/2013 | Christiansson et al. |
| 2013/0250354 A1 | 9/2013 | Kato et al. |

(56) References Cited

U.S. PATENT DOCUMENTS

| | | |
|---|---|---|
| 2013/0254314 A1 | 9/2013 | Chow |
| 2013/0257793 A1 | 10/2013 | Zeliff et al. |
| 2013/0257810 A1 | 10/2013 | Niu et al. |
| 2013/0263042 A1 | 10/2013 | Buening |
| 2013/0263240 A1 | 10/2013 | Moskovitch |
| 2013/0269867 A1 | 10/2013 | Trott |
| 2013/0271487 A1 | 10/2013 | Lincoln |
| 2013/0275082 A1 | 10/2013 | Follmer et al. |
| 2013/0279190 A1 | 10/2013 | Huang |
| 2013/0285920 A1 | 10/2013 | Colley |
| 2013/0285968 A1 | 10/2013 | Christiansson et al. |
| 2013/0285977 A1 | 10/2013 | Baharav et al. |
| 2013/0300714 A1 | 11/2013 | Goh et al. |
| 2013/0300716 A1 | 11/2013 | Craven-Bartle et al. |
| 2013/0307795 A1 | 11/2013 | Suarez Rovere |
| 2013/0307796 A1 | 11/2013 | Liu et al. |
| 2013/0321740 A1 | 12/2013 | An et al. |
| 2013/0342490 A1 | 12/2013 | Wallander et al. |
| 2014/0002400 A1 | 1/2014 | Christiansson et al. |
| 2014/0015803 A1 | 1/2014 | Drumm |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0032735 A1 | 1/2014 | Kapoor |
| 2014/0035836 A1 | 2/2014 | Cui et al. |
| 2014/0036203 A1 | 2/2014 | Guillou et al. |
| 2014/0055421 A1 | 2/2014 | Christiansson et al. |
| 2014/0367873 A1 | 2/2014 | Yang et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098032 A1 | 4/2014 | Ng et al. |
| 2014/0098058 A1 | 4/2014 | Baharav et al. |
| 2014/0104190 A1 | 4/2014 | Davidson |
| 2014/0104195 A1 | 4/2014 | Davidson |
| 2014/0109219 A1 | 4/2014 | Rohrweck et al. |
| 2014/0111416 A1 | 4/2014 | Sugiura |
| 2014/0111478 A1 | 4/2014 | Lin et al. |
| 2014/0111480 A1 | 4/2014 | Kim et al. |
| 2014/0118295 A1 | 5/2014 | Motoi |
| 2014/0125633 A1 | 5/2014 | Fåhraeus et al. |
| 2014/0139467 A1 | 5/2014 | Ghosh et al. |
| 2014/0149880 A1 | 5/2014 | Farouki |
| 2014/0152624 A1 | 6/2014 | Piot et al. |
| 2014/0160762 A1 | 6/2014 | Dudik et al. |
| 2014/0192023 A1 | 7/2014 | Hoffman |
| 2014/0204036 A1 | 7/2014 | Schillings et al. |
| 2014/0210793 A1 | 7/2014 | Eriksson et al. |
| 2014/0218467 A1 | 8/2014 | You et al. |
| 2014/0226084 A1 | 8/2014 | Utukuri et al. |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253514 A1 | 9/2014 | Omura et al. |
| 2014/0253520 A1 | 9/2014 | Cueto et al. |
| 2014/0253831 A1 | 9/2014 | Craven-Bartle |
| 2014/0259029 A1 | 9/2014 | Choi et al. |
| 2014/0267124 A1 | 9/2014 | Christiansson et al. |
| 2014/0267147 A1 | 9/2014 | Buelow et al. |
| 2014/0292690 A1 | 10/2014 | Sugihara |
| 2014/0292701 A1 | 10/2014 | Christiansson et al. |
| 2014/0300572 A1 | 10/2014 | Ohlsson et al. |
| 2014/0320459 A1 | 10/2014 | Pettersson et al. |
| 2014/0320460 A1 | 10/2014 | Johansson et al. |
| 2014/0324953 A1 | 10/2014 | Seo et al. |
| 2014/0347325 A1 | 11/2014 | Wallander et al. |
| 2014/0362046 A1 | 12/2014 | Yoshida |
| 2014/0362404 A1 | 12/2014 | Miyasaka |
| 2014/0368471 A1 | 12/2014 | Christiansson et al. |
| 2014/0375607 A1 | 12/2014 | Christiansson et al. |
| 2014/0380193 A1 | 12/2014 | Coplen et al. |
| 2015/0002386 A1 | 1/2015 | Mankowski et al. |
| 2015/0002470 A1 | 1/2015 | Zhu et al. |
| 2015/0009687 A1 | 1/2015 | Lin |
| 2015/0015497 A1 | 1/2015 | Leigh |
| 2015/0026630 A1 | 1/2015 | Bullock |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0062021 A1 | 3/2015 | Skaljak et al. |
| 2015/0062085 A1 | 3/2015 | Lu et al. |
| 2015/0070327 A1 | 3/2015 | Hsieh et al. |
| 2015/0083891 A1 | 3/2015 | Wallander |
| 2015/0091832 A1 | 4/2015 | Mizunma et al. |
| 2015/0092233 A1 | 4/2015 | Park et al. |
| 2015/0103013 A9 | 4/2015 | Huang |
| 2015/0103051 A1 | 4/2015 | Wyrwas et al. |
| 2015/0109403 A1 | 4/2015 | Krishnan et al. |
| 2015/0121691 A1 | 5/2015 | Wang |
| 2015/0130769 A1 | 5/2015 | Björklund |
| 2015/0131010 A1 | 5/2015 | Sugiyama |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0154291 A1 | 6/2015 | Shepherd et al. |
| 2015/0160851 A1 | 6/2015 | Michihata et al. |
| 2015/0169948 A1 | 6/2015 | Motoi |
| 2015/0193141 A1 | 7/2015 | Goldsmith et al. |
| 2015/0193585 A1 | 7/2015 | Sunna |
| 2015/0199071 A1 | 7/2015 | Hou |
| 2015/0205441 A1 | 7/2015 | Bergström et al. |
| 2015/0212607 A1 | 7/2015 | Miller |
| 2015/0215450 A1 | 7/2015 | Seo et al. |
| 2015/0227261 A1 | 8/2015 | Huang et al. |
| 2015/0242055 A1 | 8/2015 | Wallander |
| 2015/0253568 A1 | 9/2015 | Idzik |
| 2015/0256658 A1 | 9/2015 | Shin et al. |
| 2015/0261323 A1 | 9/2015 | Cui et al. |
| 2015/0271481 A1 | 9/2015 | Guthrie et al. |
| 2015/0286698 A1 | 10/2015 | Gagnier et al. |
| 2015/0286810 A1 | 10/2015 | Lebert |
| 2015/0288327 A1 | 10/2015 | Cherukupalli et al. |
| 2015/0302026 A1 | 10/2015 | Nam et al. |
| 2015/0309662 A1 | 10/2015 | Wyrwas et al. |
| 2015/0309765 A1 | 10/2015 | Nagahara |
| 2015/0317036 A1 | 11/2015 | Johansson et al. |
| 2015/0324028 A1 | 11/2015 | Wassvik et al. |
| 2015/0331461 A1 | 11/2015 | Delano et al. |
| 2015/0331544 A1 | 11/2015 | Bergström et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0334138 A1 | 11/2015 | Conklin et al. |
| 2015/0339000 A1 | 11/2015 | Lee et al. |
| 2015/0346856 A1 | 12/2015 | Wassvik |
| 2015/0346911 A1 | 12/2015 | Christiansson |
| 2015/0363041 A1 | 12/2015 | Zeliff et al. |
| 2015/0363042 A1 | 12/2015 | Krus et al. |
| 2015/0373864 A1 | 12/2015 | Jung |
| 2016/0004898 A1 | 1/2016 | Holz |
| 2016/0026297 A1 | 1/2016 | Shinkai et al. |
| 2016/0026337 A1 | 1/2016 | Wassvik et al. |
| 2016/0034099 A1 | 2/2016 | Christiansson et al. |
| 2016/0034109 A1 | 2/2016 | Cho et al. |
| 2016/0041629 A1 | 2/2016 | Rao et al. |
| 2016/0050263 A1 | 2/2016 | Hwang et al. |
| 2016/0050746 A1 | 2/2016 | Wassvik et al. |
| 2016/0062549 A1 | 3/2016 | Drumm et al. |
| 2016/0065633 A1 | 3/2016 | Kawakubo |
| 2016/0070415 A1 | 3/2016 | Christiansson et al. |
| 2016/0070416 A1 | 3/2016 | Wassvik |
| 2016/0092021 A1 | 3/2016 | Tu et al. |
| 2016/0098148 A1 | 4/2016 | Gandra et al. |
| 2016/0103026 A1 | 4/2016 | Povazay et al. |
| 2016/0117019 A1 | 4/2016 | Michiaki |
| 2016/0124546 A1 | 5/2016 | Chen et al. |
| 2016/0124551 A1 | 5/2016 | Christiansson et al. |
| 2016/0147375 A1 | 5/2016 | Bok et al. |
| 2016/0077616 A1 | 6/2016 | Durojaiye et al. |
| 2016/0154532 A1 | 6/2016 | Campbell |

(56) References Cited

U.S. PATENT DOCUMENTS

| | | |
|---|---|---|
| 2016/0154533 A1 | 6/2016 | Eriksson et al. |
| 2016/0179261 A1 | 6/2016 | Drumm |
| 2016/0195975 A1 | 7/2016 | Baum et al. |
| 2016/0202841 A1 | 7/2016 | Christiansson et al. |
| 2016/0209886 A1 | 7/2016 | Suh et al. |
| 2016/0210306 A1 | 7/2016 | Kumarasamy et al. |
| 2016/0216844 A1 | 7/2016 | Bergström |
| 2016/0021833 A1 | 8/2016 | Gu et al. |
| 2016/0224144 A1 | 8/2016 | Klinghult et al. |
| 2016/0227381 A1 | 8/2016 | Bargetzi et al. |
| 2016/0246390 A1 | 8/2016 | Lukanc et al. |
| 2016/0255713 A1 | 9/2016 | Kim et al. |
| 2016/0269329 A1 | 9/2016 | Willis |
| 2016/0295711 A1 | 10/2016 | Ryu et al. |
| 2016/0299583 A1 | 10/2016 | Watanabe |
| 2016/0306501 A1 | 10/2016 | Drumm et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0031516 A1 | 2/2017 | Sugiyama et al. |
| 2017/0075476 A1 | 3/2017 | Kwon et al. |
| 2017/0075484 A1 | 3/2017 | Kali et al. |
| 2017/0075494 A1 | 3/2017 | Kwon et al. |
| 2017/0083164 A1 | 3/2017 | Sheng et al. |
| 2017/0090090 A1 | 3/2017 | Craven-Bartle et al. |
| 2017/0094224 A1 | 3/2017 | Hasegawa et al. |
| 2017/0102827 A1 | 4/2017 | Christiansson et al. |
| 2017/0115235 A1 | 4/2017 | Ohlsson et al. |
| 2017/0115823 A1 | 4/2017 | Huang et al. |
| 2017/0123257 A1 | 5/2017 | Zhao |
| 2017/0131846 A1 | 5/2017 | Ayco |
| 2017/0139541 A1 | 5/2017 | Christiansson et al. |
| 2017/0147105 A1 | 5/2017 | Kwon et al. |
| 2017/0153763 A1 | 6/2017 | Vavra et al. |
| 2017/0160871 A1 | 6/2017 | Drumm |
| 2017/0177163 A1 | 6/2017 | Wallander et al. |
| 2017/0185186 A1 | 6/2017 | Liu |
| 2017/0185230 A1 | 6/2017 | Wallander et al. |
| 2017/0185269 A1 | 6/2017 | Antilla et al. |
| 2017/0192493 A1 | 7/2017 | Ofek et al. |
| 2017/0220204 A1 | 8/2017 | Huang et al. |
| 2017/0235537 A1 | 8/2017 | Liu et al. |
| 2017/0237871 A1 | 8/2017 | Fan |
| 2017/0242579 A1 | 8/2017 | Poon et al. |
| 2017/0249030 A1 | 8/2017 | Park et al. |
| 2017/0264865 A1 | 9/2017 | Huangfu |
| 2017/0285789 A1 | 10/2017 | Barel |
| 2017/0308236 A1 | 10/2017 | Lee |
| 2017/0318115 A1 | 11/2017 | Peng et al. |
| 2017/0344185 A1 | 11/2017 | Ohlsson et al. |
| 2018/0031753 A1 | 2/2018 | Craven-Bartle et al. |
| 2018/0049014 A1 | 2/2018 | Patil et al. |
| 2018/0074654 A1 | 3/2018 | Tanaka et al. |
| 2018/0107373 A1 | 4/2018 | Cheng |
| 2018/0113569 A1 | 4/2018 | Pommier et al. |
| 2018/0129311 A1 | 5/2018 | Westhues et al. |
| 2018/0129354 A1 | 5/2018 | Christiansson et al. |
| 2018/0136787 A1 | 5/2018 | Echols et al. |
| 2018/0136788 A1 | 5/2018 | He et al. |
| 2018/0149792 A1 | 5/2018 | Lee et al. |
| 2018/0204877 A1 | 7/2018 | Jalili et al. |
| 2018/0205989 A1 | 7/2018 | Srinivasan et al. |
| 2018/0225006 A1 | 8/2018 | Wall |
| 2018/0235017 A1 | 8/2018 | Sakamoto |
| 2018/0253187 A1 | 9/2018 | Christiansson et al. |
| 2018/0267672 A1 | 9/2018 | Wassvik et al. |
| 2018/0275788 A1 | 9/2018 | Christiansson et al. |
| 2018/0275830 A1 | 9/2018 | Christiansson et al. |
| 2018/0275831 A1 | 9/2018 | Christiansson et al. |
| 2018/0275836 A1 | 9/2018 | Hermans et al. |
| 2018/0279454 A1 | 9/2018 | Takeshita et al. |
| 2018/0293436 A1 | 10/2018 | Jeon et al. |
| 2018/0314206 A1 | 11/2018 | Lee et al. |
| 2018/0349014 A1 | 12/2018 | Samuel et al. |
| 2018/0356940 A1 | 12/2018 | Christiansson et al. |
| 2019/0004668 A1 | 1/2019 | Chansung et al. |
| 2019/0025977 A1 | 1/2019 | Christiansson et al. |
| 2019/0025984 A1 | 1/2019 | Weilbacher et al. |
| 2019/0050074 A1 | 2/2019 | Kocovski |
| 2019/0065030 A1 | 2/2019 | Kang et al. |
| 2019/0094990 A1 | 3/2019 | Fahraeus et al. |
| 2019/0107923 A1 | 4/2019 | Drumm |
| 2019/0146630 A1 | 5/2019 | Chen et al. |
| 2019/0155495 A1 | 5/2019 | Klein et al. |
| 2019/0196657 A1 | 6/2019 | Skagmo et al. |
| 2019/0196658 A1 | 6/2019 | Skagmo et al. |
| 2019/0196659 A1 | 6/2019 | Skagmo et al. |
| 2019/0227670 A1 | 7/2019 | O'Cleirigh et al. |
| 2019/0235701 A1 | 8/2019 | Han et al. |
| 2019/0250755 A1 | 8/2019 | Liu et al. |
| 2019/0258353 A1 | 8/2019 | Drumm et al. |
| 2019/0265941 A1 | 8/2019 | Baba |
| 2019/0012027 A1 | 10/2019 | Park et al. |
| 2019/0317640 A1 | 10/2019 | Christiansson et al. |
| 2019/0324570 A1 | 10/2019 | Kolundzjia et al. |
| 2019/0377431 A1 | 12/2019 | Drumm |
| 2019/0377435 A1 | 12/2019 | Piot et al. |
| 2020/0012408 A1 | 1/2020 | Drumm et al. |
| 2020/0064937 A1 | 2/2020 | Wassvik et al. |
| 2020/0064966 A1 | 2/2020 | Kocovski et al. |
| 2020/0073509 A1 | 3/2020 | Shih et al. |
| 2020/0098147 A1 | 3/2020 | Ha et al. |
| 2020/0125189 A1 | 4/2020 | Kim et al. |
| 2020/0159382 A1 | 5/2020 | Drumm |
| 2020/0167033 A1 | 5/2020 | Kim et al. |
| 2020/0173050 A1 | 6/2020 | Curran et al. |
| 2020/0174644 A1 | 6/2020 | Weibull et al. |
| 2020/0177742 A1 | 6/2020 | Homma et al. |
| 2020/0249777 A1 | 8/2020 | Hou et al. |
| 2020/0257405 A1 | 8/2020 | Bergström et al. |
| 2020/0293136 A1 | 9/2020 | Jakobson et al. |
| 2020/0310592 A1 | 10/2020 | Bergstrom et al. |
| 2020/0310621 A1 | 10/2020 | Piot et al. |
| 2020/0341587 A1 | 10/2020 | Drumm |
| 2020/0348473 A1 | 11/2020 | Drumm |
| 2020/0387237 A1 | 12/2020 | Drumm |
| 2021/0026466 A1 | 1/2021 | Andersson et al. |
| 2021/0026587 A1 | 1/2021 | Christiansson et al. |
| 2021/0041970 A1 | 2/2021 | Bergström et al. |
| 2021/0055825 A1 | 2/2021 | Christiansson et al. |
| 2021/0089164 A1 | 3/2021 | Christiansson et al. |
| 2021/0096604 A1 | 4/2021 | Curran et al. |
| 2021/0096691 A1 | 4/2021 | Skagmo et al. |
| 2021/0173514 A1 | 6/2021 | Kocovski et al. |
| 2021/0255662 A1 | 8/2021 | Svensson et al. |
| 2022/0035481 A1 | 2/2022 | Bergström et al. |
| 2022/0109809 A1 | 4/2022 | Wassvik et al. |
| 2022/0221955 A1 | 7/2022 | Bergstrom et al. |
| 2022/0413652 A1 | 12/2022 | Andersson et al. |
| 2023/0009306 A1 | 1/2023 | Andereasson et al. |
| 2023/0057020 A1 | 2/2023 | Wassvik |
| 2023/0080260 A1 | 3/2023 | Bergstrom et al. |
| 2023/0082401 A1 | 3/2023 | Andreasson et al. |
| 2023/0229266 A1 | 7/2023 | Bergstrom et al. |

FOREIGN PATENT DOCUMENTS

| | | |
|---|---|---|
| CA | 2745422 A1 | 6/2010 |
| CN | 101206550 A | 6/2008 |
| CN | 201233592 Y | 5/2009 |
| CN | 101174191 A | 6/2009 |
| CN | 101644854 A | 2/2010 |
| CN | 201437963 U | 4/2010 |
| CN | 201465071 U | 5/2010 |
| CN | 101882034 | 11/2010 |
| CN | 102117155 A | 7/2011 |
| CN | 101019071 B | 6/2012 |
| CN | 101206550 B | 6/2012 |
| CN | 102929449 A | 2/2013 |
| CN | 202887145 U | 4/2013 |
| CN | 103123556 A | 5/2013 |

(56) References Cited

FOREIGN PATENT DOCUMENTS

| | | |
|---|---|---|
| CN | 203189466 U | 9/2013 |
| CN | 203224848 U | 10/2013 |
| CN | 203453994 U | 2/2014 |
| CN | 101075168 B | 4/2014 |
| CN | 102414646 B | 4/2014 |
| CN | 203720812 U | 7/2014 |
| CN | 203786707 U | 8/2014 |
| CN | 203786708 U | 8/2014 |
| CN | 203825586 U | 9/2014 |
| CN | 204288179 U | 4/2015 |
| CN | 104808843 A | 7/2015 |
| CN | 204695282 | 10/2015 |
| CN | 205015574 U | 2/2016 |
| CN | 205384833 U | 7/2016 |
| CN | 106648222 A | 5/2017 |
| CN | 104391611 A | 9/2017 |
| CN | 105320382 B | 4/2021 |
| CN | 113010053 A | 6/2021 |
| DE | 3511330 C2 | 5/1988 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 10025175 A1 | 12/2001 |
| DE | 102009003990 A1 | 7/2010 |
| DE | 102010000473 A1 | 8/2010 |
| EP | 0845812 B1 | 6/1998 |
| EP | 0600576 B1 | 10/1998 |
| EP | 0931731 A1 | 7/1999 |
| EP | 1471459 A2 | 10/2004 |
| EP | 1798630 A2 | 6/2007 |
| EP | 1835464 A1 | 9/2007 |
| EP | 0897161 B1 | 10/2007 |
| EP | 2088501 A1 | 8/2009 |
| EP | 1512989 B1 | 9/2009 |
| EP | 2077490 A3 | 1/2010 |
| EP | 1126236 B1 | 12/2010 |
| EP | 2314203 A1 | 4/2011 |
| EP | 2325735 A2 | 5/2011 |
| EP | 2339437 A3 | 10/2011 |
| EP | 2442180 A1 | 4/2012 |
| EP | 2466428 A2 | 6/2012 |
| EP | 2466429 A1 | 6/2012 |
| EP | 2479642 A1 | 7/2012 |
| EP | 1457870 B1 | 8/2012 |
| EP | 2565770 A2 | 3/2013 |
| EP | 2765622 A2 | 8/2014 |
| EP | 2778849 A1 | 9/2014 |
| EP | 2840470 | 2/2015 |
| EP | 2515216 A1 | 3/2016 |
| EP | 3002666 | 4/2016 |
| EP | 3 043 242 A1 | 7/2016 |
| EP | 3535640 A1 | 9/2019 |
| EP | 3537269 A1 | 9/2019 |
| EP | 3644167 | 4/2020 |
| FR | 2172828 A1 | 10/1973 |
| FR | 2617619 B1 | 1/1990 |
| FR | 2614711 B1 | 3/1992 |
| FR | 2617620 B1 | 9/1992 |
| FR | 2676275 A1 | 11/1992 |
| GB | 1380144 A | 1/1975 |
| GB | 2131544 B | 3/1986 |
| GB | 2204126 A | 11/1988 |
| GB | 2263765 A | 8/1993 |
| GB | 2472444 A | 2/2011 |
| JP | S62159213 A | 7/1987 |
| JP | H05190066 A | 7/1993 |
| JP | 2000506655 A | 5/2000 |
| JP | 2000172438 A | 6/2000 |
| JP | 2000259334 A | 9/2000 |
| JP | 2000293311 A | 10/2000 |
| JP | 2003330603 A | 11/2003 |
| JP | 2005004278 A | 1/2005 |
| JP | 2008506173 A | 2/2008 |
| JP | 2011530124 A | 12/2011 |
| JP | 2016192688 | 11/2016 |
| JP | 2015158831 A | 2/2018 |
| KR | 100359400 | 7/2001 |
| KR | 100940435 | 2/2010 |
| KR | 101081586 B1 | 11/2011 |
| KR | 20150125374 A | 11/2015 |
| KR | 10-2016-0075643 * | 12/2017 |
| TW | M517370 U | 2/2016 |
| WO | WO 1984/003186 A1 | 8/1984 |
| WO | WO-9527919 A2 * | 10/1995 ........... G02B 27/283 |
| WO | WO 1996/010148 A1 | 4/1996 |
| WO | WO 1996/023649 A1 | 8/1996 |
| WO | WO 1999/046602 A1 | 9/1999 |
| WO | WO 2000/050807 A1 | 8/2000 |
| WO | WO 01/20781 A1 | 3/2001 |
| WO | WO 01/127867 A1 | 4/2001 |
| WO | WO 01/71654 | 9/2001 |
| WO | WO 01/84251 A2 | 11/2001 |
| WO | WO 2002/07072 A2 | 1/2002 |
| WO | WO 02/35460 A1 | 5/2002 |
| WO | WO 02/077915 A2 | 10/2002 |
| WO | WO 02/095668 A1 | 11/2002 |
| WO | WO 03/041006 A1 | 5/2003 |
| WO | WO 03/076870 A1 | 9/2003 |
| WO | WO 2004/032210 A2 | 4/2004 |
| WO | WO 2004/081502 A2 | 9/2004 |
| WO | WO 2004/081956 A2 | 9/2004 |
| WO | WO 2005/026938 A2 | 3/2005 |
| WO | WO 2005/029172 A2 | 3/2005 |
| WO | WO 2005/029395 A2 | 3/2005 |
| WO | WO 2005/125011 A1 | 12/2005 |
| WO | WO 2006/003245 A1 | 1/2006 |
| WO | WO-2006081633 A1 * | 8/2006 ............. G02B 6/122 |
| WO | WO 2006/095320 A2 | 9/2006 |
| WO | WO 2006/124551 A2 | 11/2006 |
| WO | WO 2007/003196 A2 | 1/2007 |
| WO | WO 2007/047685 A2 | 4/2007 |
| WO | WO 2007/058924 A2 | 5/2007 |
| WO | WO 2007/112742 A1 | 10/2007 |
| WO | WO 2008/004097 A2 | 1/2008 |
| WO | WO 2008/004103 A2 | 1/2008 |
| WO | WO 2008/007276 A2 | 1/2008 |
| WO | WO 2008/007372 A2 | 1/2008 |
| WO | WO 2008/017077 A2 | 2/2008 |
| WO | WO 2008/032270 A2 | 3/2008 |
| WO | WO 2008/034184 A1 | 3/2008 |
| WO | WO 2008/038066 A2 | 4/2008 |
| WO | WO 2008/039006 A1 | 4/2008 |
| WO | WO 2008/044024 | 4/2008 |
| WO | WO 2008/068607 A2 | 6/2008 |
| WO | WO 2006/124551 B1 | 7/2008 |
| WO | WO 2009/000289 A1 | 12/2008 |
| WO | WO 2009/007704 A1 | 1/2009 |
| WO | WO 2008/017077 A4 | 2/2009 |
| WO | WO 2009029764 A1 | 3/2009 |
| WO | WO 2009/048365 A1 | 4/2009 |
| WO | WO 2009/077962 A2 | 6/2009 |
| WO | WO 2009/102681 A2 | 8/2009 |
| WO | WO 2009/135320 | 11/2009 |
| WO | WO 2009/137355 A2 | 11/2009 |
| WO | WO 2010/006882 A2 | 1/2010 |
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | WO 2010/015408 A1 | 2/2010 |
| WO | WO 2010/046539 A1 | 4/2010 |
| WO | WO 2010/056177 A1 | 5/2010 |
| WO | WO 2010/064983 A2 | 6/2010 |
| WO | WO 2010/081702 A2 | 7/2010 |
| WO | WO 2010/112404 A1 | 10/2010 |
| WO | WO 2010/123809 A2 | 10/2010 |
| WO | WO 2010/134865 A1 | 11/2010 |
| WO | WO 2011/028169 A1 | 3/2011 |
| WO | WO 2011/028170 A1 | 3/2011 |
| WO | WO 2011/031215 A1 | 3/2011 |
| WO | WO 2011/049511 A1 | 4/2011 |
| WO | WO 2011/049512 A1 | 4/2011 |
| WO | WO 2011/049513 A1 | 4/2011 |

(56) References Cited

FOREIGN PATENT DOCUMENTS

| | | |
|---|---|---|
| WO | WO 2011/057572 A1 | 5/2011 |
| WO | WO 2011/078769 A1 | 6/2011 |
| WO | WO 2011/082477 A1 | 7/2011 |
| WO | WO 2011/104673 A1 | 9/2011 |
| WO | WO 2011/119483 A1 | 9/2011 |
| WO | WO 2011/139213 A1 | 11/2011 |
| WO | WO 2012/002894 A1 | 1/2012 |
| WO | WO 2012/010078 A1 | 1/2012 |
| WO | WO 2012/018176 A2 | 2/2012 |
| WO | WO 2012/050510 A1 | 4/2012 |
| WO | WO 2012/082055 A1 | 6/2012 |
| WO | WO 2012/105893 A1 | 8/2012 |
| WO | WO 2012/121652 A1 | 9/2012 |
| WO | WO 2012/158105 A2 | 11/2012 |
| WO | WO 2012/171181 | 12/2012 |
| WO | WO 2012/172302 A1 | 12/2012 |
| WO | WO 2012/176801 A1 | 12/2012 |
| WO | WO 2013/014534 | 1/2013 |
| WO | WO 2013/036192 A1 | 3/2013 |
| WO | WO 2013/048312 A2 | 4/2013 |
| WO | WO 2013/055282 A2 | 4/2013 |
| WO | WO 2013/062471 A2 | 5/2013 |
| WO | WO 2013/081818 | 6/2013 |
| WO | WO 2013/089622 A2 | 6/2013 |
| WO | WO 2013/108031 A2 | 7/2013 |
| WO | WO 2013/115710 A2 | 8/2013 |
| WO | WO 2013/126005 A2 | 8/2013 |
| WO | WO 2013/133756 A1 | 9/2013 |
| WO | WO 2013/133757 A2 | 9/2013 |
| WO | WO 2013/138003 | 9/2013 |
| WO | WO 2013/159472 | 10/2013 |
| WO | WO 2013/165305 | 11/2013 |
| WO | WO 2013/165306 | 11/2013 |
| WO | WO 2013/176613 A2 | 11/2013 |
| WO | WO 2013/176614 A2 | 11/2013 |
| WO | WO 2013/176615 A2 | 11/2013 |
| WO | WO 2013/191638 A1 | 12/2013 |
| WO | WO 2014/016685 A1 | 1/2014 |
| WO | WO 2014/017973 A1 | 1/2014 |
| WO | WO 2014/044181 A1 | 3/2014 |
| WO | WO 2014/055809 A1 | 4/2014 |
| WO | WO 2014/065601 | 5/2014 |
| WO | WO 2014/086084 A1 | 6/2014 |
| WO | WO 2014/093937 | 6/2014 |
| WO | WO 2014/098740 A1 | 6/2014 |
| WO | WO 2014/098742 | 6/2014 |
| WO | WO 2014/098743 A1 | 6/2014 |
| WO | WO 2014/098744 A1 | 6/2014 |
| WO | WO 2014/104967 A1 | 7/2014 |
| WO | WO 2014/130515 | 8/2014 |
| WO | WO 2014/131221 | 9/2014 |
| WO | WO 2015/029350 A1 | 3/2015 |
| WO | WO 2015/123322 A1 | 8/2015 |
| WO | WO 2015/175586 A1 | 11/2015 |
| WO | WO 2015/199602 A1 | 12/2015 |
| WO | WO 2015/084644 A1 | 6/2016 |
| WO | WO 2016/130074 A1 | 8/2016 |
| WO | WO 2016/160745 | 10/2016 |
| WO | WO 2016/177592 A1 | 11/2016 |
| WO | WO 2017/026821 | 2/2017 |
| WO | WO 2017/099657 | 6/2017 |
| WO | WO 2017/138863 | 8/2017 |
| WO | WO 2018/096430 A1 | 5/2018 |
| WO | WO 2018/106172 A1 | 6/2018 |
| WO | WO-2018106176 A1 * 6/2018 ............... G06F 1/16 |
| WO | WO 2018/141948 | 8/2018 |
| WO | WO 2018/182476 | 10/2018 |
| WO | WO 2019/045629 | 3/2019 |
| WO | WO 2019/156609 | 8/2019 |
| WO | WO 2019/172826 | 9/2019 |
| WO | WO 2019/172827 | 9/2019 |
| WO | WO 2020/022096 | 1/2020 |
| WO | WO 2020/078339 | 4/2020 |
| WO | WO 2020/078749 A1 | 4/2020 |
| WO | WO 2020/168802 | 8/2020 |

OTHER PUBLICATIONS

International Search Report in International Application No. PCT/SE2021/050040 dated May 10, 2021 in 3 pages.
Ahn, Y., et al., "A slim and wide multi-touch tabletop interface and its applications," BigComp2014, IEEE, 2014, in 6 pages.
Chou, N., et al., "Generalized pseudo-polar Fourier grids and applications in regfersting optical coherence tomography images," 43rd Asilomar Conference on Signals, Systems and Computers, Nov. 2009, in 5 pages.
Fihn, M., "Touch Panel—Special Edition," Veritas et Visus, Nov. 2011, in 1 page.
Fourmont, K., "Non-Equispaced Fast Fourier Transforms with Applications to Tomography," Journal of Fourier Analysis and Applications, vol. 9, Issue 5, 2003, in 20 pages.
Iizuka, K., "Boundaries, Near-Field Optics, and Near-Field Imaging," Elements of Photonics, vol. 1: In Free Space and Special Media, Wiley & Sons, 2002, in 57 pages.
International Search Report for International App. No. PCT/SE2017/050102, dated Apr. 5, 2017, in 4 pages.
International Search Report for International App. No. PCT/SE2018/050871, dated Jan. 25, 2019, in 4 pages.
International Search Report in International Application No. PCT/SE2020/051172 dated Feb. 4, 2021 in 5 pages.
Johnson, M., "Enhanced Optical Touch Input Panel", IBM Technical Disclosure Bulletin, 1985, in 3 pages.
Kak, et al., "Principles of Computerized Tomographic Imaging", Institute of Electrical Engineers, Inc., 1999, in 333 pages.
Kar-Han Tan, Robinson I N, Culbertson B, Apostolopoulos J, 'ConnectBoard: Enable Genuine Eye Contact and Accurate Gaze in Remote Collaboration', In: IEEE Transaction on Multimedia, Jun. 2011, vol. 13, No. 3, ISSN: 1520-9210.
The Laser Wall, MIT, 1997, http://web.media.mit.edu/~joep/SpectrumWeb/captions/Laser.html.
Liu, J., et al. "Multiple touch points identifying method, involves starting touch screen, driving specific emission tube, and computing and transmitting coordinate of touch points to computer system by direct lines through interface of touch screen," 2007, in 25 pages.
Natterer, F., "The Mathematics of Computerized Tomography", Society for Industrial and Applied Mathematics, 2001, in 240 pages.
Natterer, F., et al. "Fourier Reconstruction," Mathematical Methods in Image Reconstruction, Society for Industrial and Applied Mathematics, 2001, in 12 pages.
Paradiso, J.A., "Several Sensor Approaches that Retrofit Large Surfaces for Interactivity," ACM Ubicomp 2002 Workshop on Collaboration with Interactive Walls and Tables, 2002, in 8 pages.
Tedaldi, M., et al. "Refractive index mapping of layered samples using optical coherence refractometry," Proceedings of SPIE, vol. 7171, 2009, in 8 pages.
Supplementary European Search Report for European App. No. EP 16759213, dated Oct. 4, 2018, in 9 pages.
Extended European Search Report for European App. No. 16743795.3, dated Sep. 11, 2018, in 5 pages.
International Search Report for International App. No. PCT/SE2017/051224, dated Feb. 23, 2018, in 5 pages.
International Search Report for International App. No. PCT/IB2017/057201, dated Mar. 6, 2018, in 4 pages.
Extended European Search Report in European Application No. 19165019.1, dated Jul. 18, 2019 in 8 pages.
International Preliminary Report on Patentability received in International Application No. PCT/SE2017/051233, dated Jun. 11, 2019, in 6 pages.
International Search Report for International App. No. PCT/SE2018/050070, dated Apr. 25, 2018, in 4 pages.
International Search Report / Written Opinion received in International Application No. PCT/SE2021/051151 dated Jan. 26, 2022, in 13 pages.
Extended European Search Report in European Application No. 17750516.1, dated Jul. 16, 2019 in 5 pages.
Extended European Search Report in European Application No. 16873465.5, dated Jun. 25, 2019 in 9 pages.

(56) References Cited

OTHER PUBLICATIONS

Report on the Filing or Determination of an Action Regarding a Patent or Trademark. For U.S. Pat. No. 10,282,035, U.S. District of Delaware, dated Dec. 10, 2019, in 1 page.
Civil Cover Sheet *Flatfrog Laboratories AB* v. *Promethean Ltd. and Promethean Inc.,* dated Dec. 10, 2019, in 1 page.
Complaint for Patent Infringement, *Flatfrog Laboratories AB* v. *Promethean Ltd. and Promethean Inc.,* C.A. No. 19-2246, dated Dec. 10, 2019, in 83 pages.
Executed Summons in a Civil Action to Promethean Inc., C.A. No. 19-2246, dated Dec. 10, 2019 in 2 pages.
Summons in a Civil Action to Promethean Inc., C.A. No. 19-2246, dated Dec. 10, 2019 in 2 pages.
Summons in a Civil Action to Promethean Ltd., C.A. No. 19-2246, dated Dec. 10, 2019 in 2 pages.
Defendants' Answer to Second Amended Complaint and Defendant Promethean Inc.'s Counterclaims Against FlatFrog Laboratories AB., C.A. No. 19-2246, dated May 22, 2020, in 29 pages.
Extended European Search Report for European App. No. 18772370. 5, dated Dec. 9, 2020, in 8 pages.
Extended European Search Report for European App. No. 18772178. 2, dated Dec. 10, 2020, in 8 pages.
Extended European Search Report for European App. No. 18774232. 5, dated Dec. 21, 2020, in 9 pages.
Defendants' Initial Invalidity Contentions, *Flatfrog Laboratories AB* v. *Promethean Ltd. and Promethean Inc.,* C.A. No. 1:19-cv-02246-MN, dated Apr. 23, 2021, in 2 pages.
Notice of Service, *Flatfrog Laboratories AB* v. *Promethean Ltd. and Promethean Inc.,* C.A. No. 1:19-cv-02246-MN, dated Apr. 23, 2021, in 2 pages.
Exhibit 1: Invalidity Claim Chart Against U.S. Pat. No. 10,775,935 Based on Prior Public Use and/or Commercial Offer for Sale of Defendant Promethean Inc.'s ActivPanel 4.5 Product, *Flatfrog Laboratories AB* v. *Promethean Ltd. and Promethean Inc.,* C.A. No. 1:19-cv-02246-MN, dated Apr. 23, 2021, in 43 pages.
Exhibit 2: Invalidity Claim Chart Against U.S. Pat. No. 10,775,935 Based on U.S. Patent No. U.S. Pre-Grant Pub. No. 2019/0235701 to Han et al., *Flatfrog Laboratories AB* v. *Promethean Ltd. and Promethean Inc.,* C.A. No. 1:19-cv-02246-MN, dated Apr. 23, 2021, in 16 pages.
Exhibit 3A: Invalidity Claim Chart Against U.S. Pat. No. 10,775,935 Based on U.S. Pat. No. 4,751,379 to Sasaki et al., *Flatfrog Laboratories AB* v. *Promethean Ltd. and Promethean Inc.,* C.A. No. 1:19-cv-02246-MN, dated Apr. 23, 2021, in 13 pages.
Exhibit 3B: Invalidity Claim Chart Against U.S. Pat. No. 10,775,935 Based on U.S. Pat. No. 4,751,379 to Sasaki et al., *Flatfrog Laboratories AB* v. *Promethean Ltd. and Promethean Inc.,* C.A. No. 1:19-cv-02246-MN, dated Apr. 23, 2021, in 14 pages.
Exhibit 3C: Invalidity Claim Chart Against U.S. Pat. No. 10,775,935 Based on U.S. Pat. No. 4,751,379 to Sasaki et al., *Flatfrog Laboratories AB* v. *Promethean Ltd. and Promethean Inc.,* C.A. No. 1:19-cv-02246-MN, dated Apr. 23, 2021, in 13 pages.
Exhibit 4A: Invalidity Claim Chart Against U.S. Pat. No. 10,775,935 Based on U.S. Pre-Grant Pub. No. 2019/0004668 to Jeong et al., *Flatfrog Laboratories AB* v. *Promethean Ltd. and Promethean Inc.,* C.A. No. 1:19-cv-02246-MN, dated Apr. 23, 2021, in 26 pages.
Exhibit 4B: Invalidity Claim Chart Against U.S. Pat. No. 10,775,935 Based on U.S. Pre-Grant Pub. No. 2019/0004668 to Jeong et al., *Flatfrog Laboratories AB* v. *Promethean Ltd. and Promethean Inc.,* C.A. No. 1:19-cv-02246-MN, dated Apr. 23, 2021, in 15 pages.
Exhibit 4C: Invalidity Claim Chart Against U.S. Pat. No. 10,775,935 Based on U.S. Pre-Grant Pub. No. 2019/0004668 to Jeong et al., *Flatfrog Laboratories AB* v. *Promethean Ltd. and Promethean Inc.,* C.A. No. 1:19-cv-02246-MN, dated Apr. 23, 2021, in 14 pages.
Exhibit 5A: Invalidity Claim Chart Against U.S. Pat. No. 10,775,935 Based on U.S. Pat. No. 9,983,626 to Cao et al., *Flatfrog Laboratories AB* v. *Promethean Ltd. and Promethean Inc.,* C.A. No. 1:19-cv-02246-MN, dated Apr. 23, 2021, in 13 pages.
Exhibit 5B: Invalidity Claim Chart Against U.S. Pat. No. 10,775,935 Based on U.S. Pat. No. 9,983,626 to Cao et al., *Flatfrog Laboratories AB* v. *Promethean Ltd. and Promethean Inc.,* C.A. No. 1:19-cv-02246-MN, dated Apr. 23, 2021, in 15 pages.
Exhibit 5C: Invalidity Claim Chart Against U.S. Pat. No. 10,775,935 Based on U.S. Pat. No. 9,983,626 to Cao et al., *Flatfrog Laboratories AB* v. *Promethean Ltd. and Promethean Inc.,* C.A. No. 1:19-cv-02246-MN, dated Apr. 23, 2021, in 13 pages.
Exhibit 6A: Invalidity Claim Chart Against U.S. Pat. No. 10,775,935 Based on U.S. Pre-Grant Pub. No. 2019/0025984 to Weilbacher et al., *Flatfrog Laboratories AB* v. *Promethean Ltd. and Promethean Inc.,* C.A. No. 1:19-cv-02246-MN, dated Apr. 23, 2021, in 9 pages.
Exhibit 6B: Invalidity Claim Chart Against U.S. Pat. No. 10,775,935 Based on U.S. Pre-Grant Pub. No. 2019/0025984 to Weilbacher et al., *Flatfrog Laboratories AB* v. *Promethean Ltd. and Promethean Inc.,* C.A. No. 1:19-cv-02246-MN, dated Apr. 23, 2021, in 9 pages.
Exhibit 6C: Invalidity Claim Chart Against U.S. Pat. No. 10,775,935 Based on U.S. Pre-Grant Pub. No. 2019/0025984 to Weilbacher et al., *Flatfrog Laboratories AB* v. *Promethean Ltd. and Promethean Inc.,* C.A. No. 1:19-cv-02246-MN, dated Apr. 23, 2021, in 9 pages.
Exhibit 7A: Invalidity Claim Chart Against U.S. Pat. No. 10,775,935 Based on U.S. Pat. No. 9,207,800 to Eriksson et al., *Flatfrog Laboratories AB* v. *Promethean Ltd. and Promethean Inc.,* C.A. No. 1:19-cv-02246-MN, dated Apr. 23, 2021, in 9 pages.
Exhibit 7B: Invalidity Claim Chart Against U.S. Pat. No. 10,775,935 Based on U.S. Pat. No. 9,207,800 to Eriksson et al., *Flatfrog Laboratories AB* v. *Promethean Ltd. and Promethean Inc.,* C.A. No. 1:19-cv-02246-MN, dated Apr. 23, 2021, in 9 pages.
Exhibit 7C: Invalidity Claim Chart Against U.S. Pat. No. 10,775,935 Based on U.S. Pat. No. 9,207,800 to Eriksson et al., *Flatfrog Laboratories AB* v. *Promethean Ltd. and Promethean Inc.,* C.A. No. 1:19-cv-02246-MN, dated Apr. 23, 2021, in 9 pages.
Exhibit 8: Invalidity Claim Chart Against U.S. Pat. No. 10,739,916 Based on Prior Public Use and/or Commercial Offer for Sale of Defendant Promethean Inc.'s ActivPanel 4.5 Product, *Flatfrog Laboratories AB* v. *Promethean Ltd. and Promethean Inc.,* C.A. No. 1:19-cv-02246-MN, dated Apr. 23, 2021, in 21 pages.
Exhibit 9: Invalidity Claim Chart Against U.S. Pat. No. 10,739,916 Based on Chinese Utility Model No. CN 203786707 U to Chen et al., *Flatfrog Laboratories AB* v. *Promethean Ltd. and Promethean Inc.,* C.A. No. 1:19-cv-02246-MN, dated Apr. 23, 2021, in 4 pages.
Exhibit 10: Invalidity Claim Chart Against U.S. Pat. No. 10,739,916 Based on International App. Pub. No. WO2014131221 to Chen et al., *Flatfrog Laboratories AB* v. *Promethean Ltd. and Promethean Inc.,* C.A. No. 1:19-cv-02246-MN, dated Apr. 23, 2021, in 4 pages.
Exhibit 11: Invalidity Claim Chart Against U.S. Pat. No. 10,739,916 Based on Chinese Pub. App. No. 104391611 A to Hu et al., *Flatfrog Laboratories AB* v. *Promethean Ltd. and Promethean Inc.,* C.A. No. 1:19-cv-02246-MN, dated Apr. 23, 2021, in 4 pages.
Exhibit 12: Invalidity Claim Chart Against U.S. Pat. No. 10,739,916 Based on Chinese Utility Model No. 203786708 U to Cao, *Flatfrog Laboratories AB* v. *Promethean Ltd. and Promethean Inc.,* C.A. No. 1:19-cv-02246-MN, dated Apr. 23, 2021, in 4 pages.
Exhibit 13: Invalidity Claim Chart Against U.S. Pat. No. 10,739,916 Based on Chinese Utility Model No. 204288179 U to Mo et al., *Flatfrog Laboratories AB* v. *Promethean Ltd. and Promethean Inc.,* C.A. No. 1:19-cv-02246-MN, dated Apr. 23, 2021, in 4 pages.
Defendants Promethean Ltd. and Promethean Inc.'s Preliminary Proposed Claim Constructions, *Flatfrog Laboratories AB* v. *Promethean Ltd. and Promethean Inc.,* C.A. No. 1:19-cv-02246-MN, dated May 24, 2021, in 8 pages.
Defendants' Sur-Reply Claim Construction Brief, *Flatfrog Laboratories AB* v. *Promethean Ltd. and Promethean Inc.,* C.A. No. 1:19-cv-02246-MN, dated Sep. 13, 2021, in 24 pages.
ASTM International, "Standard Specification for Heat-Treated Flat Glass-Kind HS, Kind FT Coated and Uncoated Glass," Designation: C 1048-04, in 7 pages.
British Standard, "Glass in building—Thermally toughened soda lime silicate safety glass," EN 12150-1:2000, ISBN 0 580 36171 3, Aug. 15, 2000, in 28 pages.
Joint Claim Construction Brief, *Flatfrog Laboratories AB* v. *Promethean Ltd. and Promethean Inc.,* C.A. No. 1:19-cv-02246-MN, dated Sep. 20, 2021, in 92 pages.
Joint Appendix of Exhibits to Joint Claim Construction Brief, *Flatfrog Laboratories AB* v. *Promethean Ltd. and Promethean Inc.,*

(56) References Cited

OTHER PUBLICATIONS

C.A. No. 1:19-cv-02246-MN, dated Sep. 20, 2021, in 127 pages, (uploaded in 4 parts, part 1 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 63 pages, (uploaded in 4 parts, part 2 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 65 pages, (uploaded in 4 parts, part 3 of 4).
Joint Appendix of Exhibits to Joint Claim Construction Brief, *Flatfrog Laboratories AB v. Promethean Ltd. and Promethean Inc.*, C.A. No. 1:19-cv-02246-MN, dated Sep. 20, 2021, in 128 pages, (uploaded in 4 parts, part 4 of 4).
International Search Report in PCT/SE2019/050189 dated May 29, 2019 in 5 pages.
International Search Report for International App. No. PCT/SE2019/050953, dated Nov. 26, 2019, in 4 pages.
International Search Report for International App. No. PCT/SE2020/050043, dated Feb. 24, 2020, in 5 pages.
International Search Report for International App. No. PCT/SE2020/050504, dated Apr. 9, 2020, in 5 pages.
International Search Report in App. No. PCT/SE2020/051117 dated Feb. 5, 2021 in 2 pages.
International Search Report in International App. No. PCT/SE2021/050086 dated Feb. 26, 2021 in 6 pages.
International Search Report in International Application No. PCT/SE2021/050095 dated Jun. 2, 2021 in 7 pages.
International Search Report / Written Opinion of the International Searching Authority for PCT/SE2021/051018, dated Feb. 1, 2022, in 10 pages.
Anderson, R. Rox, B.S., and John A. Parrish, M.D. "The Optics of Human Skin." Journal of Investigative Dermatology 77.1 (1981): 13-19.
Barzilai et al., Two-Point Step Size Gradient Methods, IMA Journal of Numerical Analysis, 1988, pp. 141-148.
Bose, R, "Strongly regular graphs, partial geometries and partially balanced designs", Pacific J. Math., vol. 13, No. 2 (1963), pp. 389-419.
Chen. Yhun, "Using micro-structures to couple light into thin light-guides," Master of Science Thesis, Stockholm, 2011.
Cornelissen, Hugo J. et al. "Injecting Light of High-Power LEDs into Thin Light Guides." Proc. SPIE 7652. International Optical Design Conference (2010): 7652121-7652126.
Ericson, Chris, "Real-Time Collision Detection", The Morgan Kaufmann Series in Interactive 3D Technology (2005) Chapters 5-9, pp. 125-412.
Golub et al: "Matrix Norms" in: "Matrix Computations" Aug. 21, 2005 (Aug. 21, 2005), Johns Hopkins University Press, pp. 54-59.s.
Holzammer, Andereas "Combining Diffuse Illumination and Frustrated Total Internal Reflection for touch detection", Oct. 22, 2009 (Oct. 22, 2009), Retrieved from the Internet: URL:http://www.eecs.tu-berlin.de/fileadmin/fg144/Research/Theses/Holzammer/Thesis Andreas holzammer.pdf *.
Horwood, A. et al: "Image Normalization, a Basic Requirement for Computer-based Automatic Diagnostic Applications", May 1, 2001 (May 1, 2001), retrieved from the Internet: URL:http://facweb.cs.depaul.edu/research/vc/seminar/Paper/Feb22_2008Emili_1mageNormalization.odf*p. 9, line 1—p. 14, line 1*.
Mu, Cong et al. "Dielectric multilayer angular filters for coupling LEDs to thin light guides." Proc SPIE 8170 (2011): 817001-1-817001-10.
O'Rourke, Joseph, "Computational Geometry in C", Second Edition, Cambridge University Press, (1998), pp. 252-264.
Press et al., "Numerical Recipes the Art of Scientific Computing", Third Edition, Cambridge University Press, 2007, pp. 1-1235.
Scheuplein, Robert J., Ph.D. "A Survey of Some Fundamental Aspects of the Absorption and Reflection of Light by Tissue." J. Soc. Cos. Chem. 15 (1964): 111-122.
Swedish Search Report in Application No. 1350181.2 dated Dec. 11, 2013.
Thomas, G.L et al., "Some observations on fingerprint deposits." J. Phys. D: Appl. Phys. 8 (1975): 724-729.
Supplementary European Search Report for European App. No. EP 16749542, dated Sep. 6, 2018, in 9 pages.
Supplementary European Search Report for European App. No. EP 13752508, dated Aug. 27, 2015.
Supplementary European Search Report for European App. No. EP 13744212, dated Aug. 14, 2015.
International Search Report & written opinion received in Application No. PCT/SE2013/050137 dated Oct. 15, 2013.
European Search Report issued in European Application No. 11777650.0, dated Nov. 22, 2013.
International Search Report & Written Opinion for International App. No. PCT/SE2014/051363, dated Feb. 15, 2015.
International Search Report & written opinion in International App. No. PCT/SE2013/050064, dated Sep. 12, 2013.
International Search Report for International App. No. PCT/SE2016/050155, dated Jul. 15, 2016, in 10 pages.
International Search Report for International App. No. PCT/SE2019/050195, dated Jun. 12, 2019, in 4 pages.
International Search Report and Written Opinion issued in International Application No. PCT/SE2010/051107 dated Jan. 24, 2011.
International Search Report and Written Opinion issued in International Application No. PCT/SE2010/051105 dated Nov. 16, 2010.
International Search Report and Written Opinion issued in International Application No. PCT/SE2010/051103 dated Jan. 25, 2011.
International Search Report and Written Opinion dated Apr. 15, 2014 issued in corresponding International Application No. PCT/SE2013/051533.
International Search Report dated Apr. 23, 2014 issued in corresponding International Application No. PCT/EP2018/052757.
International Search Report and Written Opinion dated May 6, 2014 issued in International Application No. PCT/SE2013/051534.
International Search Report and Written Opinion dated Feb. 3, 2014 issued in International Application No. PCT/SE2013/050473.
International Search Report for International App. No. PCT/EP2019/077054, dated Jan. 10, 2020, in 3 pages.
International Search Report for International App. No. PCT/SE2019/050190, dated Jun. 12, 2019, in 4 pages.
International Search Report and Written Opinion dated Nov. 27, 2018 in International App. No. PCT/SE2018/050896.
International Search Report for International App. No. PCT/SE2019/050343, dated Sep. 3, 2019, in 4 pages.
International Search Report dated Sep. 25, 2015, in connection with SE 1550087-9 filed on Jan. 28, 2015.
International Search Report PCT/ISA/210; International Search Report dated Nov. 28, 2011, in International Application PCT/SE2011/050871.
European Search Report dated Apr. 19, 2012 issued in European Application No. 09830665.7.
International Search Report and Written Opinion for International App. No. PCT/SE2019/050193, dated Apr. 10, 2019, in 4 pages.
International Search Report and Written Opinion dated Apr. 8, 2022 in International Application No. PCT/SE2022/050139.
Japanese Office Action issued in Japanese Patent Application No. 2011-539479, dated Feb. 19, 2014.
Non-Final Office Action dated Mar. 23, 2017 in U.S. Appl. No. 14/652,736.
Non-Final Office Action dated Jun. 20, 2018 in U.S. Appl. No. 14/652,736.
Non-Final Office Action dated May 4, 2017 in U.S. Appl. No. 14/652,757.
Non-Final Office Action dated Jun. 14, 2018 in U.S. Appl. No. 14/652,757.
Final Office Action dated Nov. 30, 2017 in U.S. Appl. No. 14/652,737.
Final Office Action dated Nov. 24, 2017 in U.S. Appl. No. 14/652,757.
Giphy | Randy, the Badly Drawn Horse, posted on Feb. 12, 2020 by T.L. McBeth, no copyright date posted [online], [site visited Oct. 13, 2020]. Available from Internet, <URL: https://giphy.com/stories/randy-the-badly-drawn-horse-258d6753-fb29/>.

(56) References Cited

OTHER PUBLICATIONS

Giphy | Stickers | Closer Look Sticker by Cavan Infante, posted on May 24, 2019 by Cavan Infante, no copyright date posted [online], [ site visited Oct. 13, 2020]. Available from Internet, URL: https://giphy.com/stickers/circle-underline-cavan-ZbB9lCitwN43fJvNSz.
Tympanus/Codrops | Animated Mesh Lines, posted on Jan. 8, 2019 by Jeremie Boulay, © Codrops 2020 [online], [site visited Oct. 13, 2020]. Available from Internet, <URL: https://tympanus.net/codrops/2019/01/08/animated-mesh-lines/>.

* cited by examiner

TOUCH-SENSING APPARATUS

TECHNICAL FIELD

The present invention pertains to touch-sensing apparatus that operate by propagating light above a panel. More specifically, it pertains to optical and mechanical solutions for controlling and tailoring the light paths above the panel via fully or partially randomized refraction, reflection or scattering.

BACKGROUND ART

In one category of touch-sensitive panels known as 'above surface optical touch systems', a set of optical emitters are arranged around the periphery of a touch surface to emit light that is reflected to travel and propagate above the touch surface. A set of light detectors are also arranged around the periphery of the touch surface to receive light from the set of emitters from above the touch surface. I.e. a grid of intersecting light paths are created above the touch surface, also referred to as scanlines. An object that touches the touch surface will attenuate the light on one or more scanlines of the light and cause a change in the light received by one or more of the detectors. The location (coordinates), shape or area of the object may be determined by analyzing the received light at the detectors.

Optical and mechanical characteristics of the touch-sensitive apparatus affects the scattering of the light between the emitters/detectors and the touch surface, and the accordingly the detected touch signals. For example, the width of the scanlines affects touch performance factors such as detectability, accuracy, resolution, and the presence of reconstruction artefacts. Problems with previous prior art touch detection systems relate to sub-optimal performance with respect to the aforementioned factors. Further, variations in the alignment of the opto-mechanical components affects the detection process which may lead to a sub-optimal touch detection performance. Factors such as signal-to-noise ratio, detection accuracy, resolution, the presence of artefacts etc, in the touch detection process may be affected. While prior art systems aim to improve upon these factors, e.g. the detection accuracy, there is often an associated compromise in terms of having to incorporate more complex and expensive opto-mechanical modifications to the touch system. This typically results in a less compact touch system, and a more complicated manufacturing process, being more expensive.

SUMMARY

An objective is to at least partly overcome one or more of the above identified limitations of the prior art.

One objective is to provide a touch-sensitive apparatus which is compact, less complex, robust and easy to assemble.

Another objective is to provide an "above-surface"-based touch-sensitive apparatus with efficient use of light.

One or more of these objectives, and other objectives that may appear from the description below, are at least partly achieved by means of touch-sensitive apparatuses according to the independent claims, embodiments thereof being defined by the dependent claims.

According to a first aspect, a touch sensing apparatus is provided comprising a panel that defines a touch surface extending in a plane having a normal axis, a plurality of emitters and detectors arranged along a perimeter of the panel, a light directing portion arranged adjacent the perimeter and comprising a light directing surface, wherein the emitters are arranged to emit light and the light directing surface is arranged to receive the light and direct the light across the touch surface, wherein the panel comprises a rear surface, opposite the touch surface, and the emitters and/or the detectors are arranged opposite the rear surface to emit and/or receive light through a channel in a frame element, the channel is arranged opposite the rear surface and extends in a direction of the normal axis, wherein the light directing surface and the channel are arranged on opposite sides of the panel and overlap in the direction of the plane, whereby the light directing surface receive light from the emitters, or direct light to the detectors, through the panel and through the channel, in the direction of the normal axis.

According to a second aspect, a method of manufacturing a frame element for a touch sensing apparatus is provided, comprising extruding the frame element to form a light directing portion and a cavity adapted to receive a substrate comprising emitters and/or detectors, and milling a wall portion of the cavity to form a channel so that, in use, a light directing surface of the light directing portion receive light from the emitters, or direct light to the detectors, through the channel.

Some examples of the disclosure provide for a more compact touch sensing apparatus.

Some examples of the disclosure provide for a touch sensing apparatus that is less costly to manufacture.

Some examples of the disclosure provide for a touch sensing apparatus with a reduced number of electro-optical components.

Some examples of the disclosure provide for a more robust touch sensing apparatus.

Some examples of the disclosure provide for a touch sensing apparatus that is more reliable to use.

Some examples of the disclosure provide for reducing stray light effects.

Some examples of the disclosure provide for reducing ambient light sensitivity.

Some examples of the disclosure provide for a touch sensing apparatus that has a better signal-to-noise ratio of the detected light.

Some examples of the disclosure provide for a touch-sensing apparatus with improved resolution and detection accuracy of small objects.

Some examples of the disclosure provide for a touch-sensing apparatus with less detection artifacts.

Some examples of the disclosure provide for a touch-sensing apparatus with a more uniform coverage of scanlines across the touch surface.

Still other objectives, features, aspects and advantages of the present disclosure will appear from the following detailed description, from the attached claims as well as from the drawings.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

These and other aspects, features and advantages of which examples of the invention are capable of will be apparent and elucidated from the following description of examples of the present invention, reference being made to the accompanying drawings, in which.

DETAILED DESCRIPTION OF EXAMPLE EMBODIMENTS

Figure 1A:
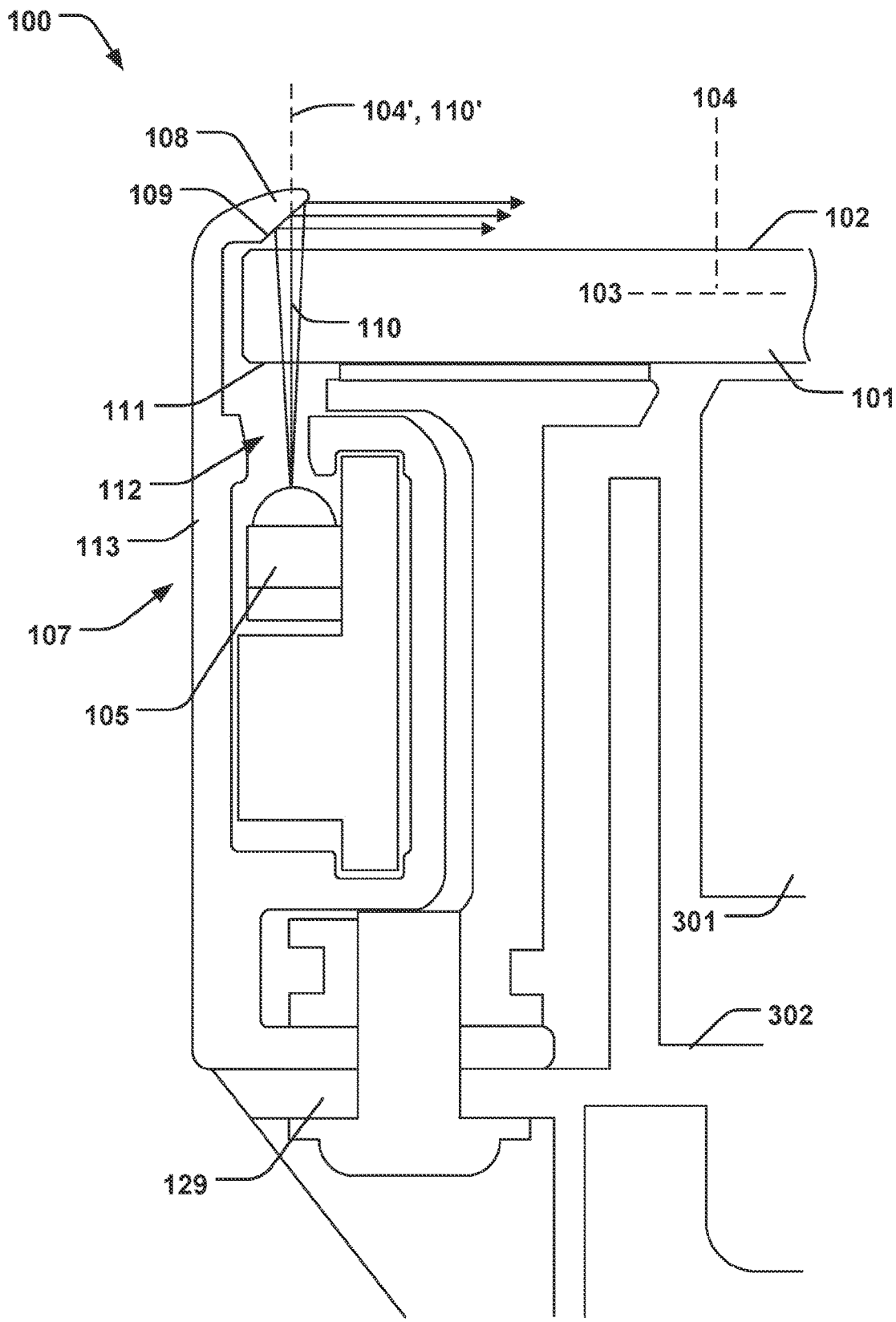
FIG. 1a is a schematic illustration, in a cross-sectional side view, of a touch-sensing apparatus, according to one example of the disclosure.

In the following, embodiments of the present invention will be presented for a specific example of a touch-sensitive apparatus. Throughout the description, the same reference numerals are used to identify corresponding elements.

Figure 1B:
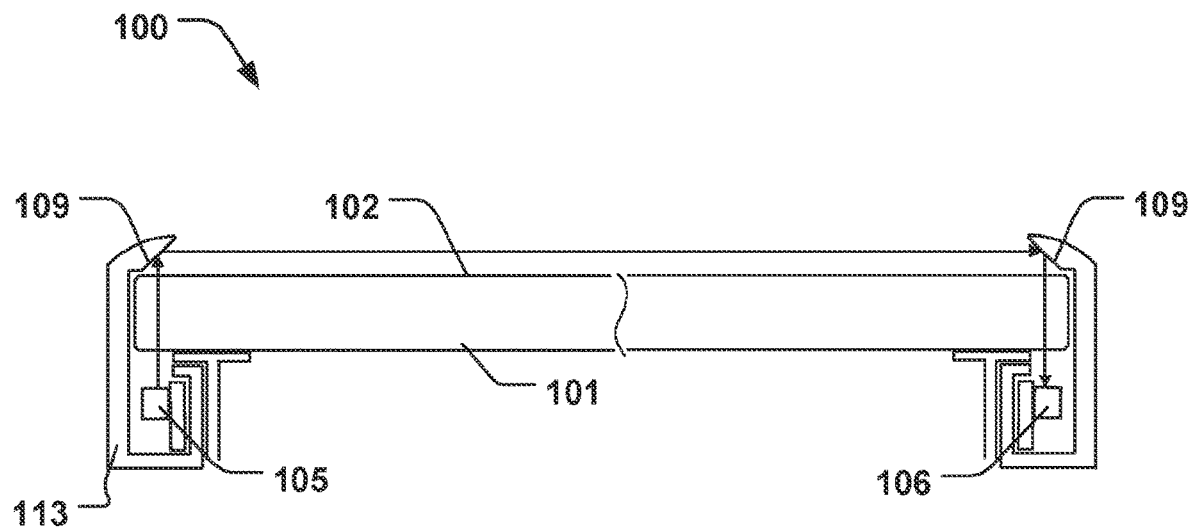
FIG. 1b is a schematic illustration, in a cross-sectional side view, of a touch-sensing apparatus, according to one example of the disclosure.
Figure 1C:
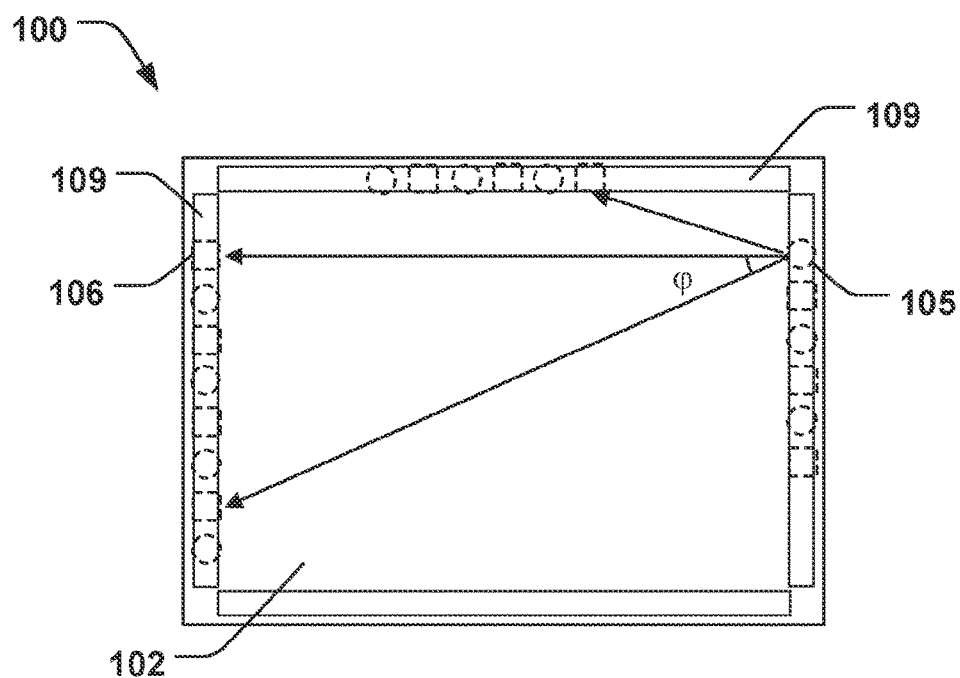
FIG. 1c is a schematic illustration, in a top-down view, of a touch-sensing apparatus, according to one example of the disclosure.
Figure 1D:
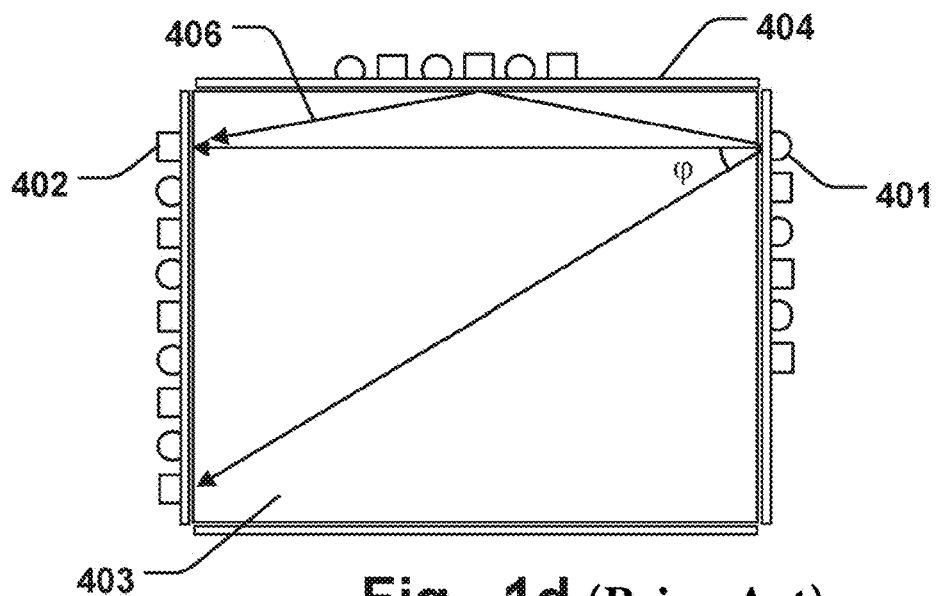
FIGS. 1d-e are schematic illustrations, in top-down views, of an example of a prior art touch-sensing apparatus.
Figure 1E:
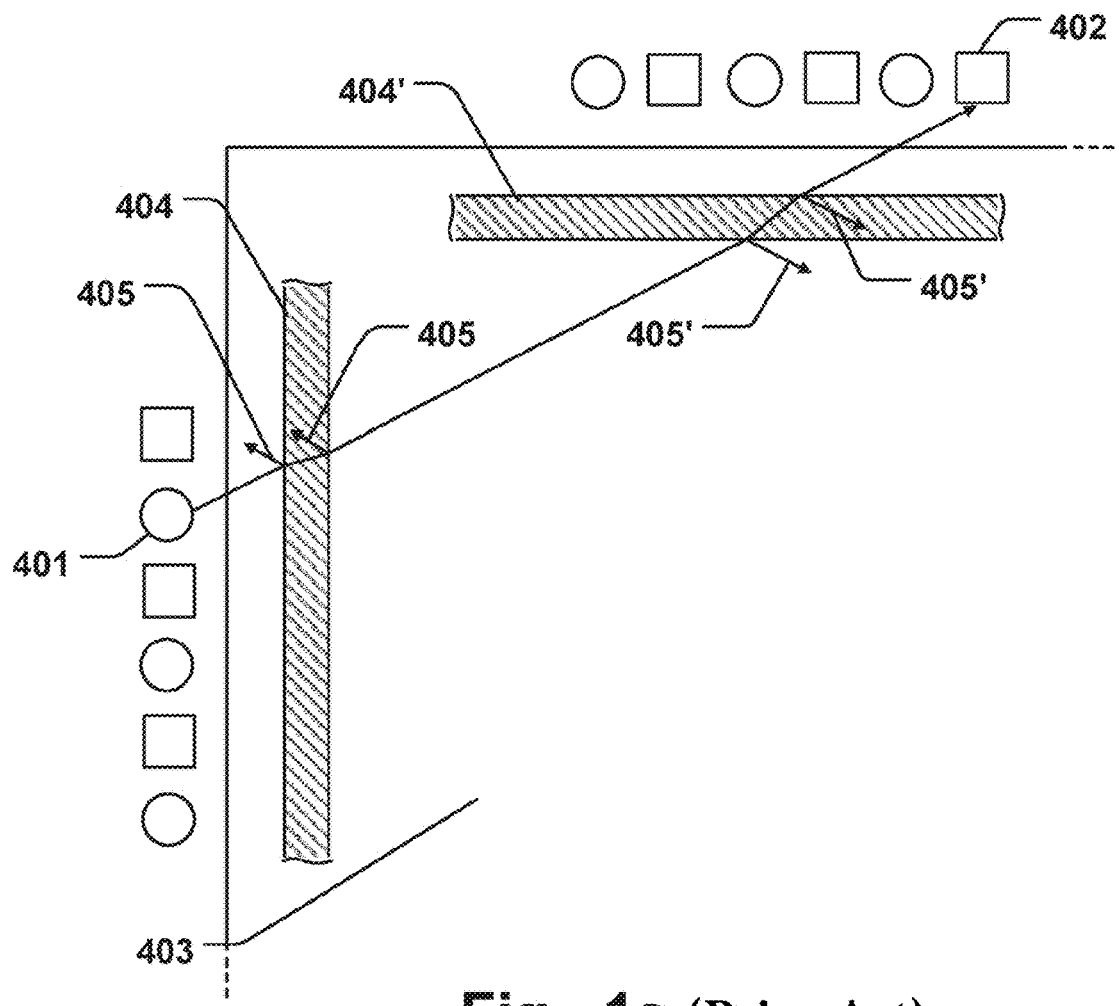
Figure 2:
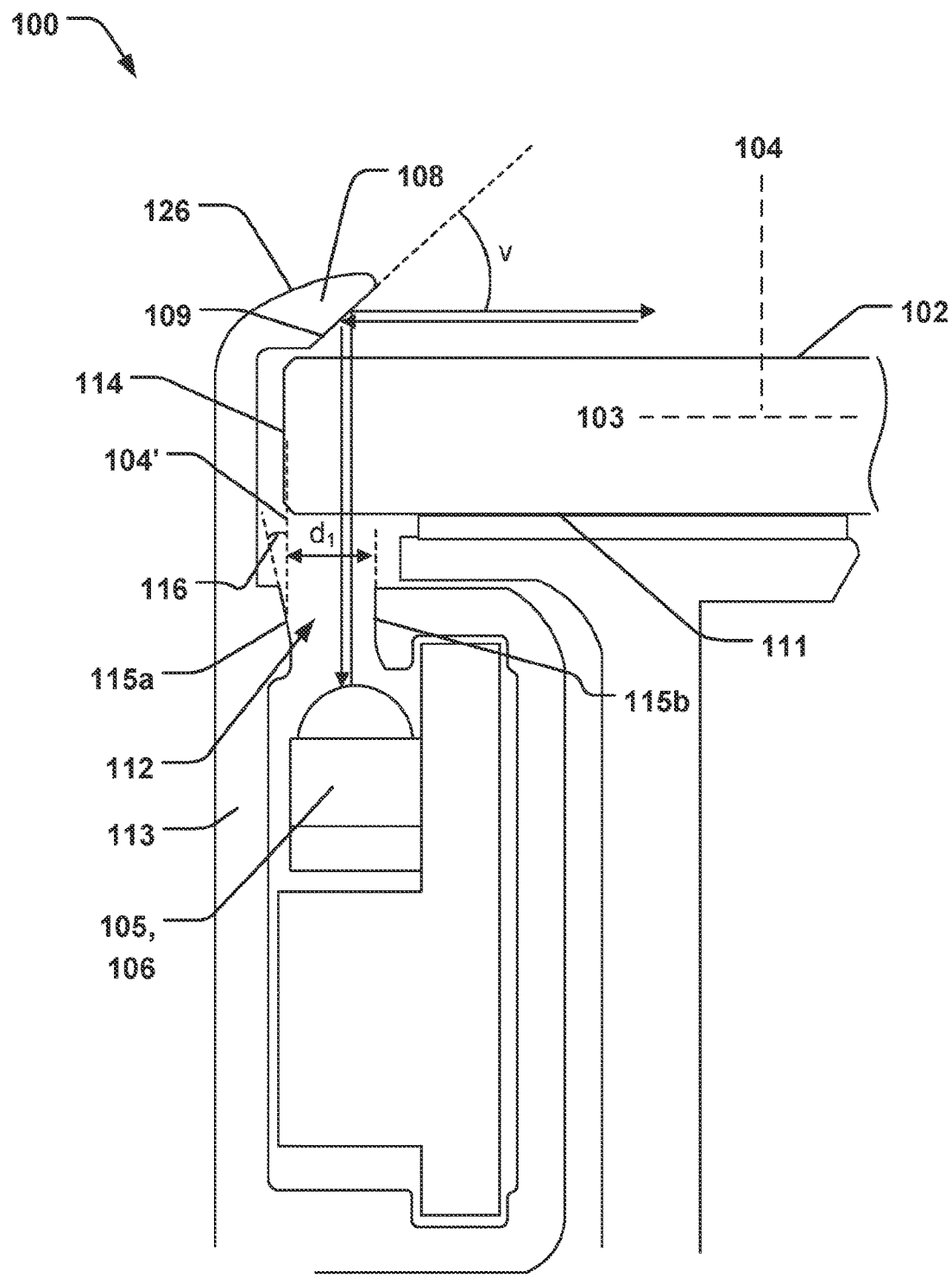
FIG. 2 is a schematic illustration, in a cross-sectional side view, of a touch-sensing apparatus, according to one example of the disclosure.
Figure 4:
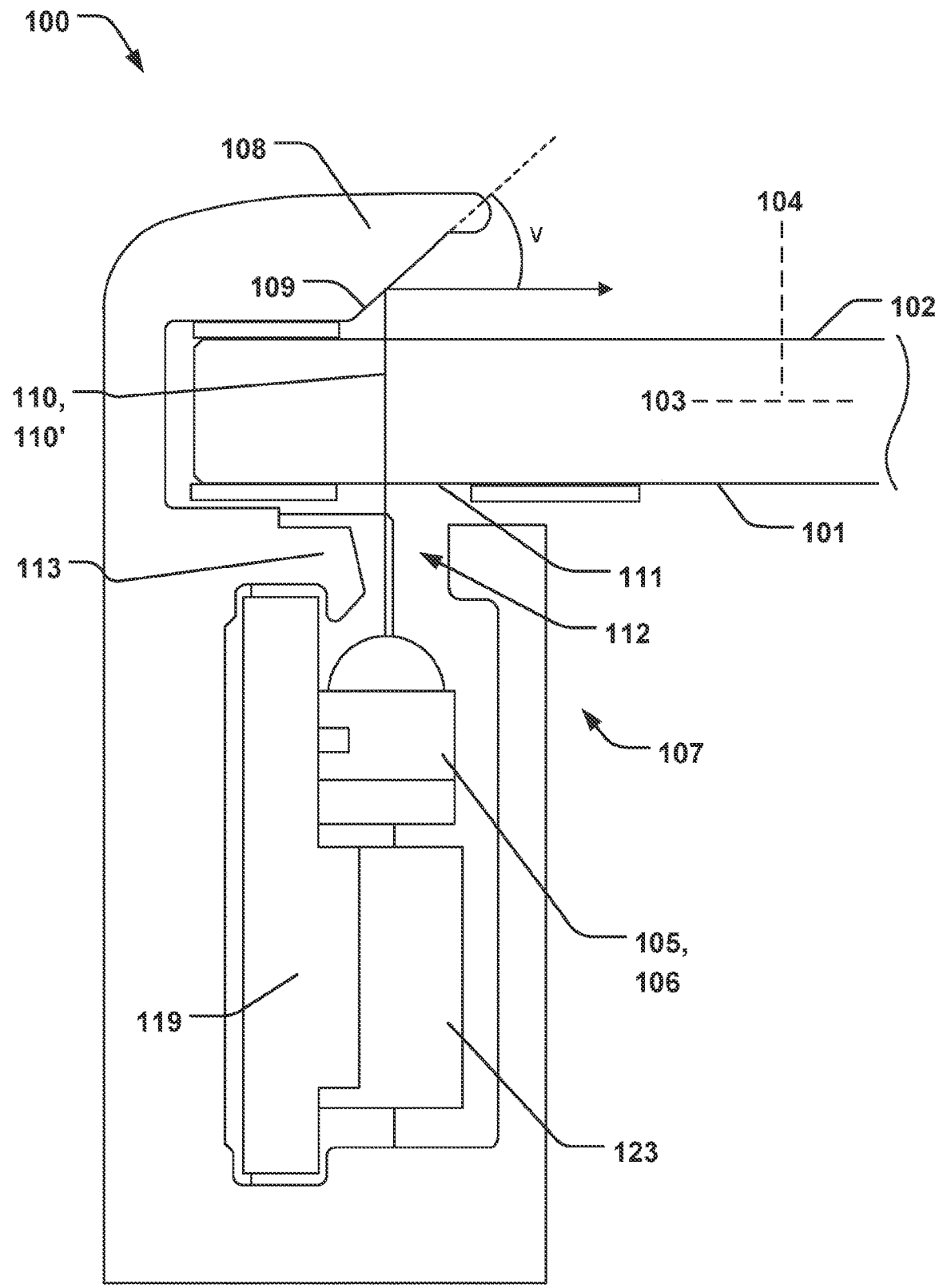
FIG. 4 is a schematic illustration, in a cross-sectional side view, of a touch-sensing apparatus, according to one example of the disclosure.

FIG. 1a is a schematic illustration of a touch-sensing apparatus 100 comprising a panel 101 that defines a touch surface 102 extending in a plane 103 having a normal axis 104. The panel 101 is a light transmissive panel. The touch-sensing apparatus 100 comprises a plurality of emitters 105 and detectors 106 arranged along a perimeter 107 of the panel 101. FIG. 1a shows only an emitter 105 for clarity of presentation, while FIG. 1b illustrates how light is transmitted from an emitter 105 to a detector 106 across the touch surface 102. The touch-sensing apparatus 100 comprises a light directing portion 108 arranged adjacent and along the perimeter 107. The light directing portion 108 comprises a light directing surface 109. The emitters 105 are arranged to emit light 110 and the light directing surface 109 is arranged to receive the light 110 and direct the light across touch surface 102 of the panel 101. The light is reflected to detectors 106, after propagating across the touch surface 102, via a corresponding light directing surface 109, as illustrated in FIG. 1b. FIG. 1c is a schematic top-down view of the touch-sensing apparatus 100. FIG. 2 shows also schematically the reflection from the emitters 105, and to the detectors 106. The panel 101 comprises a rear surface 111, opposite the touch surface 102, and the emitters 105 and/or the detectors 106 are arranged opposite the rear surface to emit and/or receive light 110 through a channel 112 in a frame element 113 of the touch-sensing apparatus 100. The channel 112 is arranged opposite the rear surface 111 and extends in a direction 104' of the normal axis 104, i.e. essentially in parallel with the normal axis 104. The light directing surface 109 and the channel 112 are arranged on opposite sides of the panel 101 and overlap along the direction of the plane 103. I.e. there is an overlap in the horizontal position of the light directing surface 109 and the channel 112 in FIG. 1a, so that the light path may extend vertically from the light directing surface 109 to the channel 112. The light directing surface 109 is arranged to receive light 110 from the emitters 105, or direct light to the detectors 106, through the panel 101 and further through the channel 112, in the direction 104' of the normal axis 104. It should be understood that the main optical axis 110' of light emission may be extending essentially along the direction 104', but that the light also has an angular spread around the optical axis 110', as indicated in FIG. 1a. Having the light directing surface 109 arranged above the channel 112 as exemplified in FIG. 1a and FIG. 4 provides for effective shielding of ambient light or system stray light. The amount of ambient or stray light reflected towards the detectors 106 may thus be minimized, and the signal to noise ratio can be improved. Having the emitters 105 emitting light 110 in the direction 104' of the normal 104, thus having an optical axis 110' of the light 110 essentially parallel with the normal axis 104, as further exemplified in FIG. 1a and FIG. 4, facilitates reducing the dimensions of the touch-sensing apparatus 100 along the perimeter. The cross-sectional footprint of the emitter 105—and detector 106 assembly may be minimized, e.g. in the direction of the plane 103 in FIGS. 1a and 4. The described arrangement may also provide for minimizing angular reflections against the panel 101, which can be advantageous in some applications. Having the light 110 propagating through the panel 101 provides for a further synergetic effect in terms of providing a compact touch-sensing apparatus 100 and minimizing the number of optical components since the panel 101 acts as a sealing element for the emitters 105 and detectors 106 from the surroundings. The panel 101 may thus act as a sealing portion to protect electronics from e.g. liquids and dust. Further optical sealing elements may thus be dispensed with. This is further advantageous in that the angle by which the light scatters across the panel 101 may be further increased, with less reflection losses, providing for an improved scanline coverage across the panel 101. For example, Fresnel reflection losses can be minimized, as described further with respect to FIG. 1d. FIG. 1d shows an example of a prior art touch-sensing apparatus, with emitters 401 and detectors 402 arranged along sides of a touch surface 403, and an optical sealing component 404 arranged along the sides. The optical sealing component 404 is arranged above the touch surface 403 and between the reflection surfaces on opposite sides which reflects the light across the touch surface 403 (i.e. corresponding to the position of the light directing surfaces 109). Having such additional optical sealing component 404 may introduce unwanted reflections by the light transmitted over the touch surface 403, in particularly when the light is reflected at high-angles along the sides of the touch surface 403, as indicated by reflection 406 in FIG. 1d. FIG. 1e is a further detailed view of the example in FIG. 1d, illustrating further reflections 405, 405', at each interface of such additional optical sealing component 404, 404'. Such reflections 405, 405', could lead to significant loss of light, particularly if having the additional optical sealing component 404, 404', along each side of the touch surface 403.

The reduced number of components may be particularly advantageous in some applications where additional compactness is desired. This provides also for reducing the cost of the touch-sensing apparatus 100. As will be described in more detail below, the light directing portion 108 may be formed as part of the frame element 113 so that the light directing surface 109 is formed in the material of the frame element 113. This further reduces the number of opto-mechanical components along the path of the light from the touch surface 102 to the emitters 105 and detectors 106. The number of components needing alignment is thus also reduced, which simplifies assembly. A particularly compact and robust touch-sensing apparatus 100 is thus provided, with more efficient use of detection light. Touch detection performance may thus be increased, while reducing complexity and costs.

An angle (v) between the light directing surface 109 and the plane 103 of the touch surface 102 may be less than 45 degrees, as exemplified in FIG. 2 and FIG. 4. This provides for reducing the amount of unwanted reflections of the light across the touch surface 102, again exemplified by the reflection 406 in FIG. 1d, which otherwise may cause artifacts or other disturbances when detecting the attenuation of the touch signal. Unwanted light reflections may instead be reflected out of the plane 103 if having the angle (v) less than 45 degrees. The angle (v) may be in the range 41-44 degrees in some examples, for a particularly advantageous reduction unwanted light reflections. The angle (v) may be more than 45 degrees. For example, having the angle (v) in the range 46-49 degrees can also reduce unwanted reflections of the type illustrated by scanline 406 in FIG. 1d. It should be understood that the advantageous benefits as described above for the touch-sensing apparatus 100, i.e. less complex, more compact and cost-effective manufacturing process, applies to examples where the angle (v) is both above 45 degrees and below 45 degrees.

The panel 101 has edges 114 extending between the touch surface 102 and the rear surface 111. The channel 112 extends in a direction parallel with the plane 102 with a width ($d_1$) between a first channel wall 115a, arranged closest to a respective edge 114 of the panel 101, and an opposite second channel wall 115b, as schematically illustrated in e.g. FIG. 2 and FIG. 5. The first channel wall 115a may extend with an angle 116 towards the direction 104' of the normal axis 104. Having an angled channel wall 115a provides for reducing the amount of ambient light reflected towards detectors 106. A larger portion of any ambient light being reflected against channel wall 115a will be reflected in a direction past the detector 106, while also reducing light from the emitter 105 which goes directly past the light directing surface 109, which may cause stray light problems.

Figure 3:
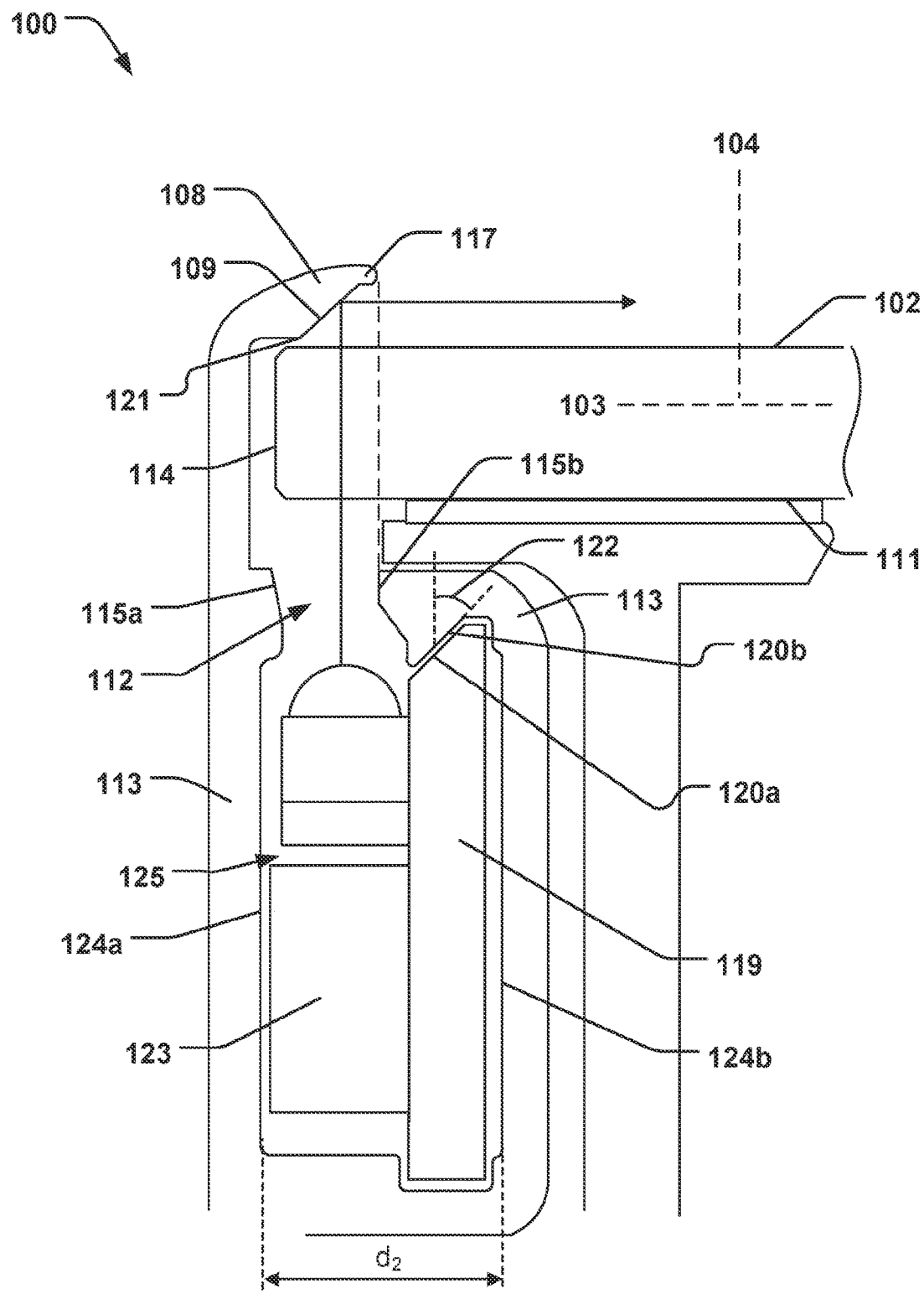
FIG. 3 is a schematic illustration, in a cross-sectional side view, of a touch-sensing apparatus, according to one example of the disclosure.
Figure 5:
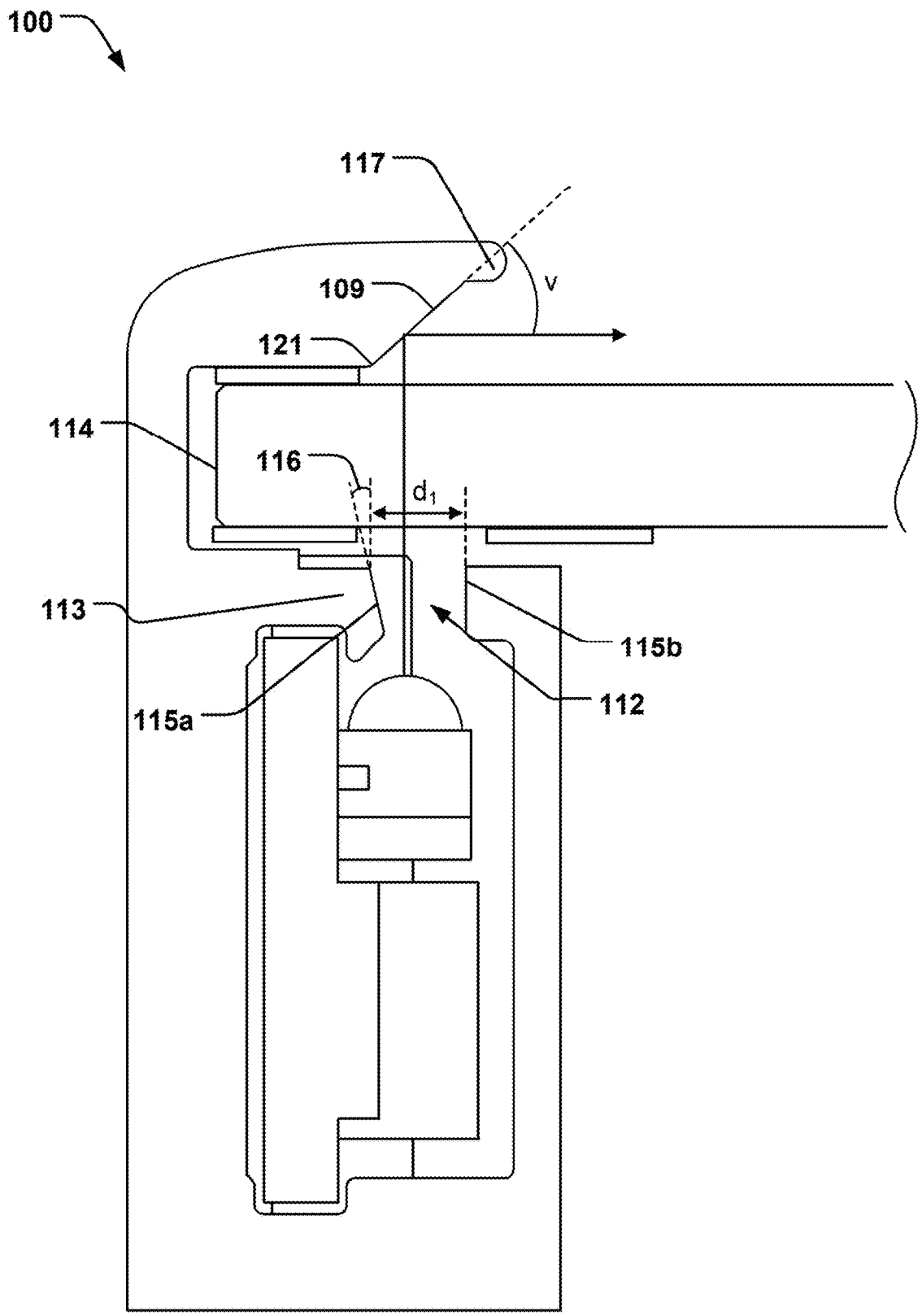
FIG. 5 is a schematic illustration, in cross-sectional side view, of a touch-sensing apparatus, according to one example of the disclosure.

The light directing portion 108 has an edge portion 121 corresponding to the part of the light directing portion 108 being arranged closest to the touch surface 102, as illustrated in FIG. 3 and FIG. 5. The light directing surface 109 may extend from the edge portion 121 of the light directing portion 108 to a protrusion 117 of the light directing portion 108, as schematically illustrated in FIG. 3 and FIG. 5. The protrusion 117 may extend in a direction parallel with the plane 103 to shield ambient light from being reflected towards the channel 112.

The width ($d_1$) of the channel 112 may be further varied for optimizing the amount of light 110 emitted towards the light directing surface 109 while providing sufficient shielding from ambient or stray light. The positions of the first and second channel walls 115a, 115b, along the direction of the plane 103 relative the emitters 105 and/or detectors 106 may be optimized depending on the particular implementation. In one example, as schematically illustrated in FIG. 3, the position of the second channel wall 115b is aligned with the position of the protrusion 117 along the direction of the plane 103. This may be particularly advantageous for shielding of ambient or stray light. At the same time blocking of the emitted light 110 may be avoided when optimizing the position of the emitters 105 relative the center of the channel 112. The surface properties of the channel walls 115a, 115b, may also be tailored to avoid loss of detection light or reduce the impact of ambient or stray light as described further below.

Figure 6:
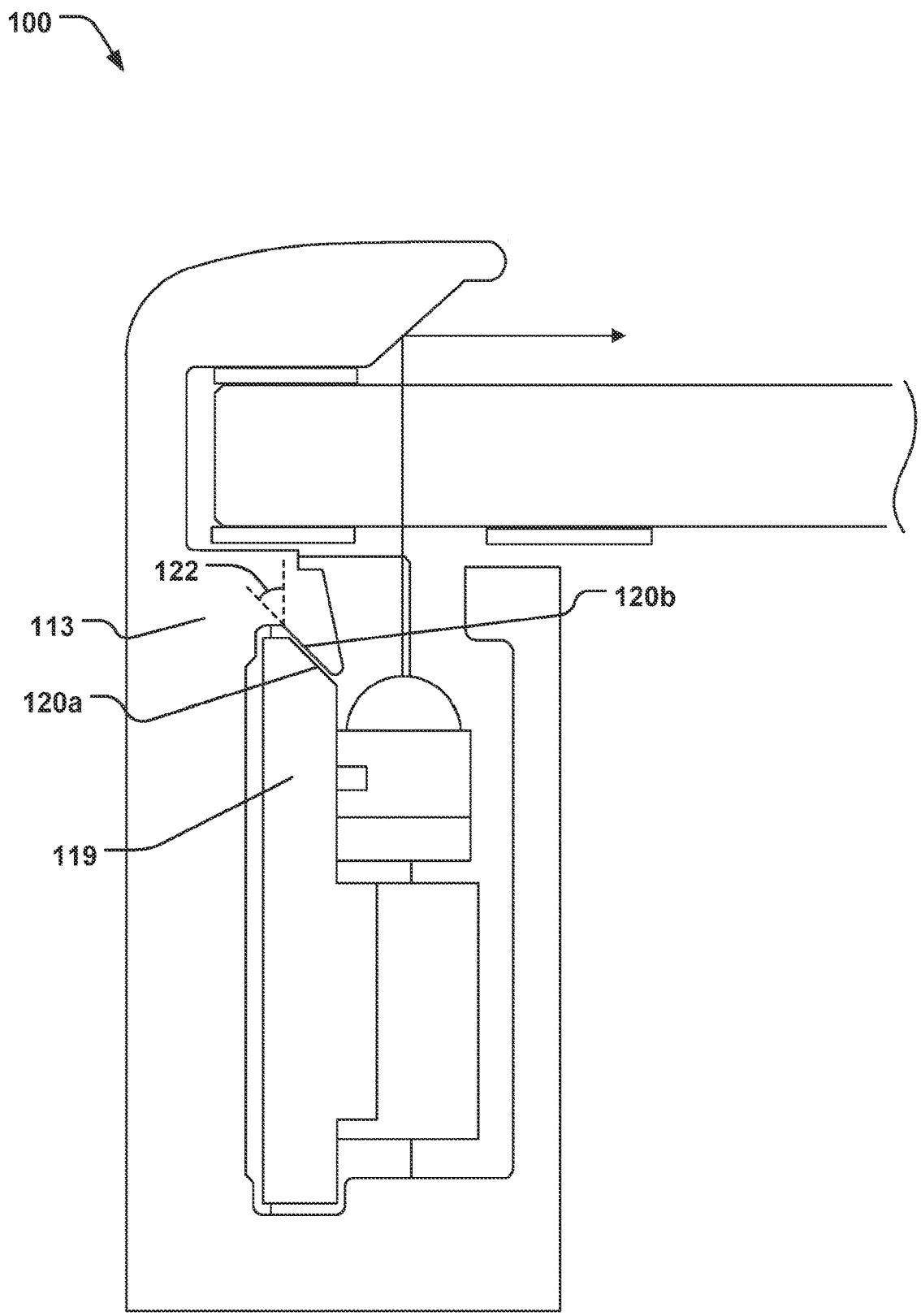
FIG. 6 is a schematic illustration, in cross-sectional side view, of a touch-sensing apparatus, according to one example of the disclosure.

The emitters 105 and/or detectors 106 may be mounted to a substrate 119. The substrate 119 may comprise a chamfered edge 120a to be arranged opposite a corresponding mating surface 120b of the frame element 113. The mating surface 120b of the frame element 113 may form an angle 122 with the normal axis 104, as schematically illustrated in FIG. 3 and FIG. 6. The allows for effectively locking the substrate 119 in place in the correct position relative the frame element 113. A secure alignment of the emitters 105 and/or detectors 106 relative the light directing surface 109 may thus be facilitated, which in turn facilitates signal optimization. Providing an angled surface 120b of the frame element 113, as exemplified in FIG. 3, may at the same time allow for removing at least part of the second channel wall 115, closest to the substrate 119, and reduce the risk of blocking light from the emitters 105, or to the detectors 106 (see e.g. FIG. 2 versus FIG. 3).

The walls 115a, 115b, of the channel 112 may comprise a diffusive light scattering surface. The walls 115a, 115b, may thus also be utilized as reflective elements that allows better light management, e.g. recycling of light and reflecting light from lost directions towards the light directing surface 109. A larger portion of the emitted light 110 may thus be utilized. At the same time, the surface of the walls 115a, 115b, may be tailored to provide a specular component of the reflected light. This allows for improving the directionality of the reflected light, e.g. for directing the light towards the light directing surface 109 above the panel 101. The ratio of the specular component of the reflected light may be varied by performing different surface treatments of the channel walls 115, 115b, to affect e.g. the surface roughness thereof. The reflecting properties of the light directing surface 109 may also be varied by such surface treatments, which may comprise etching, bead blasting, sand blasting, brushing, and/or anodization, as described in more detail below.

A support 123 may be attached to the substrate 119, as exemplified in FIG. 3 and FIG. 4. The support 123 may extending in a direction parallel with the plane 103 between the substrate 119 and a frame wall 124*a*, 124*b*, of the frame element 113. The support 123 may facilitate alignment of the substrate 119 relative the frame element 113. This may facilitate manufacturing and allow for accurate positioning of the emitters 105 and/or detectors 106 relative the frame element 113.

The frame element 113 may be shaped to form a cavity 125. The emitters 105 and/or detectors 106 are mounted to a substrate 119 and the substrate 119 may be arranged in the cavity 125 so that the emitters 105 and/or detectors 106 are arranged closer to the respective edge 114 of the panel 101 than the substrate 119, as schematically illustrated in FIG. 3. This provides for minimizing the width of the bezel, i.e. the width of the light directing portion 108 along the direction of the plane 103, since the emitters 105 and/or detectors 106 are placed closer to the edges 114 of the panel 101, while maintaining the advantageous sealing effect of the panel 101 as mentioned above. A more compact touch-sensing apparatus 100 is thus provided.

In particular, the cavity 125 may extend in a direction parallel with the plane 103 with a width ($d_2$) between a first frame wall 124*a*, arranged closest to the respective edge 114 of the panel 101, and an opposite second frame wall 124*b*. The substrate 119 may be arranged in the cavity 125 so that the emitters 105 and/or detectors 106 are arranged closer to the first frame wall 124*a* than the substrate 119, as exemplified in FIG. 3. This allows for minimizing the width of the bezel along the direction of the plane 103.

The substrate 119 may extend with an elongated shape in a direction 104' of the normal axis 104, as exemplified in FIG. 2. This provides for reducing the dimensions of the touch sensing apparatus 100 in the direction perpendicular to the normal axis 104, which may be desirable in some applications where the amount of space in this direction is limited, and/or when the ratio of available touch surface 102 to the surrounding frame components is to be optimized. Having the substrate 119 extending along the direction 104' of the normal axis 104 combined with having the emitters 105 and/or detectors 106 arranged closer to the first frame wall 124*a* than the substrate 119 provides for particularly efficient utilization of space along the direction of the plane 103.

Figure 9A:
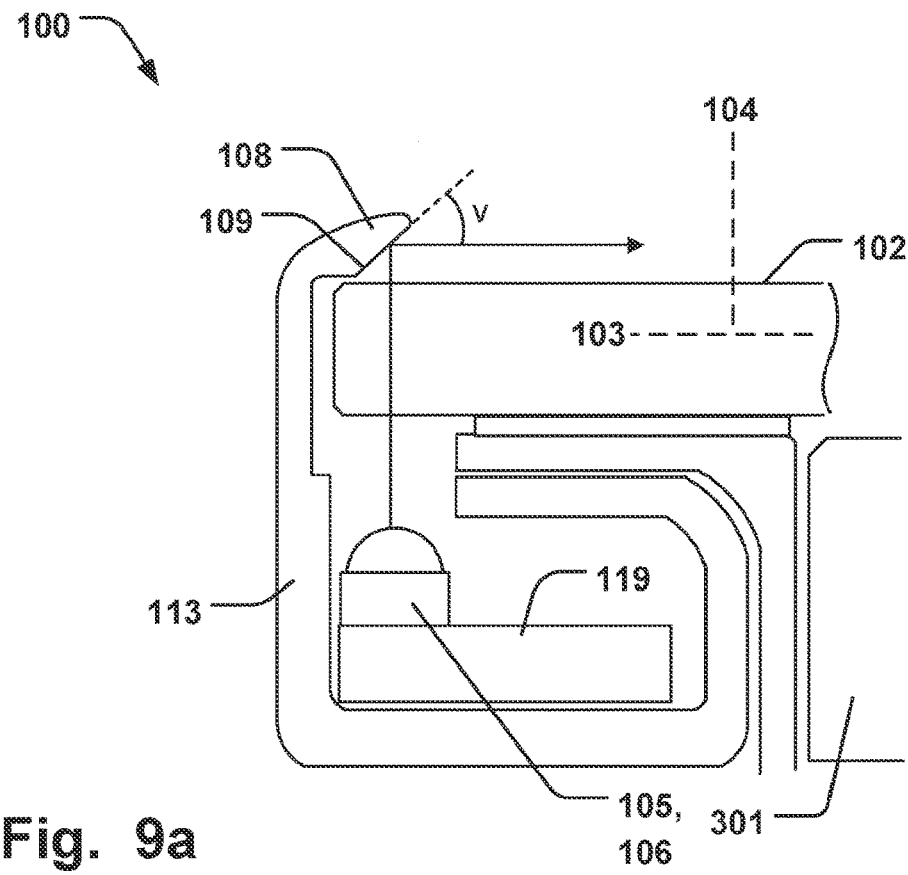
FIG. 9a is a schematic illustration, in a cross-sectional side view, of a touch-sensing apparatus, according to one example of the disclosure.
Figure 9B:
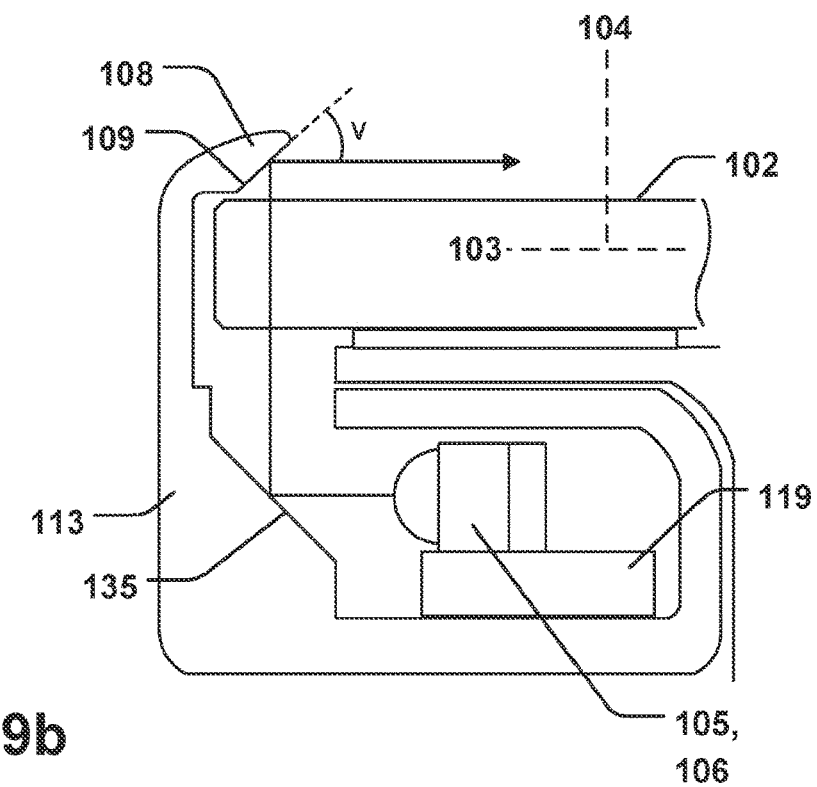
FIG. 9b is a schematic illustration, in a cross-sectional side view, of a touch-sensing apparatus, according to one example of the disclosure.

FIG. 9*a* show an example where the substrate 119 extends along the direction of the plane 103, which provides for achieving compact dimensions along the direction of the normal axis 104. This may be advantageous when utilized in conjunction with particularly flat display panels 301, although the dimensions in the direction of the plane 103 around the displayed area may increase in such case. FIG. 9*b* is another example where the substrate 119 extends along the direction of the plane 103, but the emitters 105 and/or detectors 106 are arranged to emit/receive light in the direction of the plane 103 via a reflective surface 135. This provides for achieving compact dimensions along the direction of the normal axis 104. The reflective surface 135 may be a specular reflective surface.

The light directing surface 109 may be anodized metal. The light directing surface 109 may also be surface treated to diffusively reflect the light 110 towards the touch surface 102. The anodization process changes the microscopic texture of the surface 109, and increases the thickness of the natural oxide layer on the surface 109. The thickness and porosity of the anodized oxide surface may be varied. The anodized surface may be dyed in various colors for achieving the desired appearance. Several different colors may provide advantageous reflectance values in the infrared range, such as over 80%, for example aluminium being anodized in black, grey or silver. Other metals may also provide advantageous reflectance characteristics, such as silver. It may be particularly advantageous to use wavelengths above 940 nm where many anodized materials start to reflect significantly. Different colors may also be provided by using different alloys of e.g. aluminium. The diffusive and specular reflection components of the reflectance may be varied by performing different surface treatments of the anodized metal or alloys. The surface roughness may thus be varied to optimize the ratio of the aforementioned reflection components. The directionality of the reflected light may be increased by increasing the specular component, whereas the amount of random scattering increased with the diffusive component. For example, increasing the specular component of the reflection from the light directing surface 109 may increase the strength of the scan lines. In such case the number and/or position of the emitters 105 may be varied to compensate for any narrowing of the scanlines resulting from reduction in diffusive light scattering. Hence, in some examples, the reflective characteristics of the light directing surface 109 may be optimized, while allowing for the desired aesthetic appearance of an anodized surface.

Different surface roughness characteristics may be achieved by various processes, such as etching, sand blasting, bead blasting, machining, brushing, polishing, as well as the anodization mentioned above. In one example, the light directing surface 109 may have a surface roughness defined by a slope RMS ($\Delta q$) between 0.1-0.35. The slope RMS ($\Delta q$) may be between 0.1-0.25 for an advantageous diffusivity. Higher values may decrease the strength of the signals, and too low signals may lead to a more tolerance sensitive systems where the angle ($\varphi$) by which the light is spread in the plane 103 across the touch surface 102 (as indicated by angle $\varphi$ in the example of in FIG. 1*c*) is reduced and limited by emitter and detectors viewing angles. Also, scanline width may become too narrow. In another example the slope RMS ($\Delta q$) may be between 0.13-0.20 for a particularly advantageous diffusivity providing for an optimized signal strength and touch detection process, while maintaining an advantageous power consumption of the components of the touch sensing apparatus 100.

When having appropriate slope variation, the height variations of blasted or etched surface are typically in the 1 to 20 um range. However the slope RMS ($\Delta q$) optimization as described above provides for the most effective tailoring of the reflective characteristics. In some examples the light directing surface 109 has a low roughness. In one example, the light directing surface 109 may be an anodized metal surface which has not undergone any processing to increase the surface roughness. The light directing surface 109 may in such case be anodized directly after the extrusion process. The light directing surface 109 may in such case be mirror-like, i.e. the surface 109 has not undergone any processing to achieve spreading of the light. In such case the slope RMS ($\Delta q$) may be between 0-0.1, for providing a mirror-like surface. Such surface may be advantageous in applications where narrow scanlines are desired for a particular touch detection process. E.g. when it is advantageous to increase the amount of available detection light in desired directions across the touch surface 102.

The frame element 113 may comprise the light directing portion 108. I.e. the light directing portion 108 is formed directly from the frame element 113 as an integral piece, e.g. by extrusion. The frame element 113, and the light directing portion 108, may be formed from various metals, such as aluminium. The light directing surface 109 may thus be an anodized metal surface of the frame element 113. The frame element 113 may thus be utilized as a diffusive light scattering element, without having to provide a separate optical component for diffusive light scattering. The number of components may thus be reduced even further with such integrated light directing surface 109. This further removes the need for having an additional optical sealing element to protect such separate optical component. A more robust touch-sensing apparatus 100 which is easier to assemble is thus provided. Further, the surface of the walls 115a, 115b, of the channel 112 may be a metal surface of the frame element 113. The reflective characteristics of the walls 115a, 115b, may be tailored as mentioned above with respect to the light directing surface 109. The frame element 113 may form a cavity 125 in which the emitters 105 and/or detectors 106 are arranged. The frame element 113 may thus be formed as a single integral piece with light directing surfaces 109, 115a, 115b, and cavity 125 for the substrate 119, as well as any mounting interface 129 to a back frame 302 for a display 301, as schematically indicated in FIG. 1a. This allows for minimizing the number of opto-mechanical components of the touch-sensing apparatus 100, further providing for a particularly robust touch-sensing apparatus 100 which is less complex and more viable for mass-production.

The light directing portion 108 may comprise an outer surface 126 opposite the light directing surface 109, as indicated in e.g. FIG. 2. The light directing surface 109 may have a higher reflectance than the outer surface 126. Providing the light directing portion 108 of the frame element 113 with different surface treatments allows for having an effective and optimized scattering of light across the touch surface 102, via the light directing surface 109, while the outer surface 126 facing the user has a low reflectance for minimizing light reflections towards the user. Further, this provides for giving a desired cosmetical appearance, while not affecting the optical function (e.g. avoiding having light directing surface 109 too matte by having too high slopes. A particularly effective utilization of the manufacturing materials may thus be realized, since sections of a single integral piece of the frame element 113 may be uniquely treated to achieve the desired functionality of light reflectivity. For example, alignment of separate optical components is not needed.

In one example, the walls 115a, 115b of the channel 112 may have a higher specular reflectance than the light directing surface 109. This may provide for a more controlled reflection of emitted light towards the light directing surface 109. The light directing surface 109 may in turn provide a larger diffusive component for broadening of the scanlines across the touch surface 102.

In one aspect a touch sensing apparatus 100 is provided, comprising a panel 101 that defines a touch surface 102 extending in a plane 103 having a normal axis 104. A plurality of emitters 105 and detectors 106 arranged along a perimeter 107 of the panel 101. A light directing portion 108 is arranged adjacent the perimeter 107 and comprises a light directing surface 109. The emitters 105 are arranged to emit light 110 and the light directing surface 109 is arranged to receive the light 110 and direct the light 110 across the touch surface 102. The panel 101 comprises a rear surface 111, opposite the touch surface 102. The emitters 105 and/or the detectors 106 are arranged opposite the rear surface 111 to emit and/or receive light through a channel 112 in a frame element 113. The light directing surface 109 receive light from the emitters 105, or direct light to the detectors 106, through the panel 101 and through the channel 112. The frame element 113 is formed from a metal and comprises the light directing portion 108, where the light directing surface 109 is an anodized metal surface of the frame element 113. The frame element 113 may also form a cavity 125 in which the emitters 105 and/or the detectors 106 are arranged so that an optical axis 110' of the emitted light 110 is essentially parallel with the normal axis 104. The touch sensing apparatus 100 thus provides for the advantageous benefits as described above, by providing for a compact touch sensing apparatus 100 with improved signal to noise ratio and increased touch detection performance.

Figure 7A:
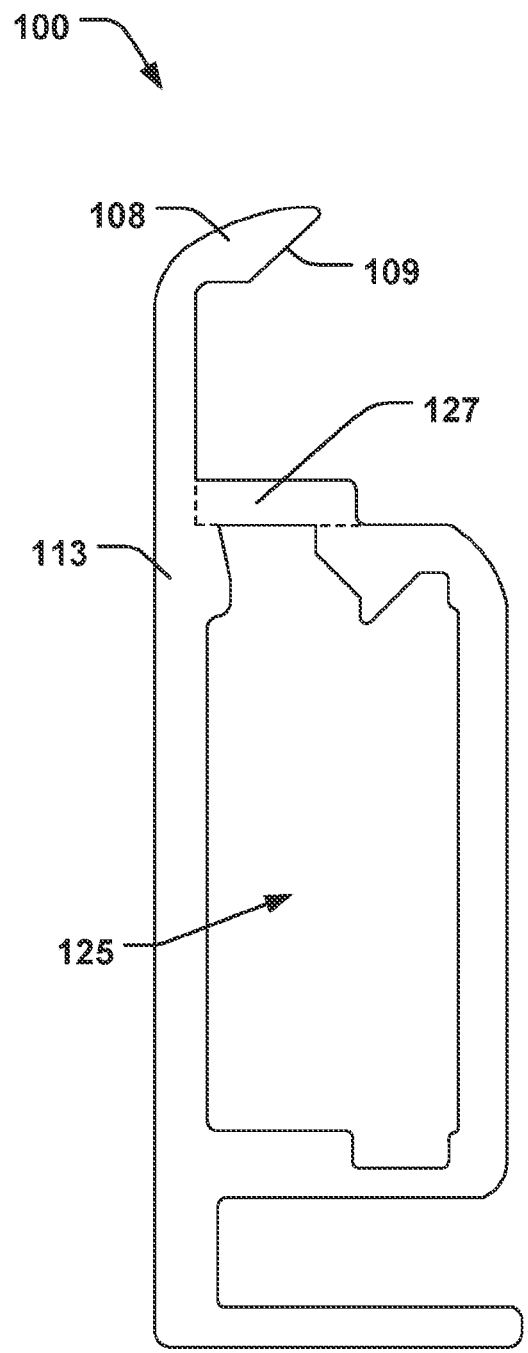
FIGS. 7a-c are schematic illustrations, in a cross-sectional side views, of a frame element for a touch-sensing apparatus, according to examples of the disclosure.
Figure 7B:
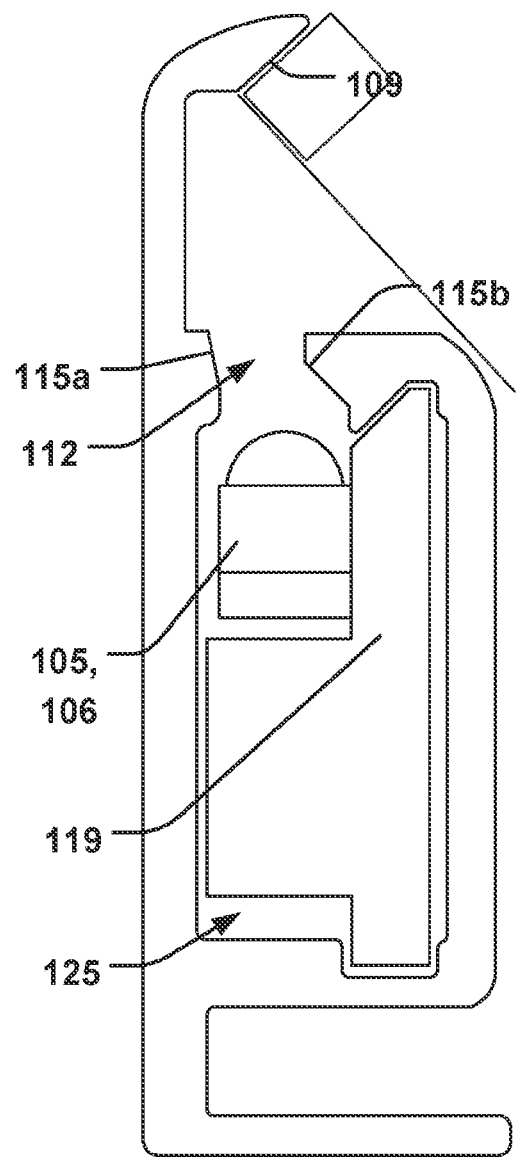
Figure 10A:
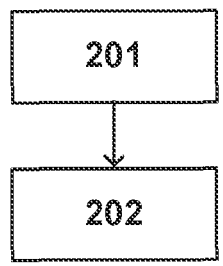
FIG. 10a is a flow-chart of a method of manufacturing a frame element for a touch sensing apparatus, according to one example of the disclosure.

FIG. 10a is a flowchart of a method 200 of manufacturing a frame element 113 for a touch sensing apparatus 100. The method 200 comprises extruding 201 the frame element 113 to form a light directing portion 108 and a cavity 125 adapted to receive a substrate 119 comprising emitters 105 and/or detectors 106. FIG. 7a shows an example of such extruded frame element 113. The method 200 further comprises milling 202 a wall portion 127 of the cavity 125 to form a channel 112. FIG. 7a indicates with dashed lines the wall portion 127 which is milled away, so that an open channel 112 is provided into the cavity 125, as exemplified in FIG. 7b. The channel 112 is defined by channel walls or surfaces 115a, 115b. A light directing surface 109 of the light directing portion 108 may thus receive light from the emitters 105, or direct light to the detectors 106, through the channel 112, when the substrate 119 is arranged in the cavity 125. Thus, a single integral piece of the frame element 113 may be provided, by the extrusion 201 and milling 202, which incorporates the functions of alignment and support for the substrate 119 as well as light directing surfaces 109, 115a, 115b. A facilitated manufacturing is provided while the structural integrity and the desired tolerances of the frame element 113 may be maintained during the process. Further, the milling 202 provides for customizing the dimensions of the channel 112, which is difficult during the extrusion process.

Figure 7C:
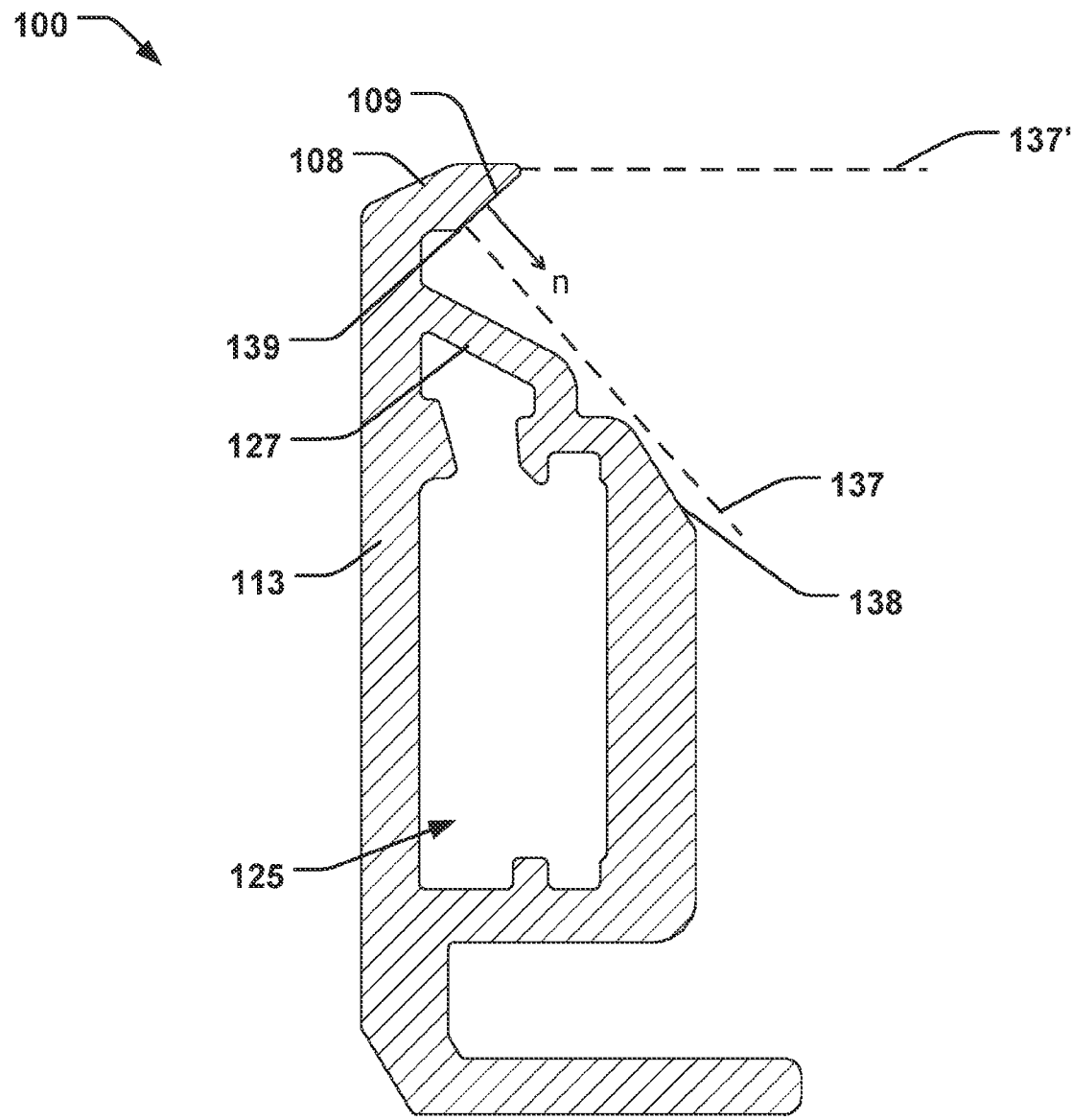

FIG. 7c shows another example of an extruded frame element 113. The frame element 113 may be shaped so that the light directing surface 109 has a free line of sight 137, 137' to facilitate any subsequent surface treatment of the light directing surface 109. The line of sight 137, 137', may extend in parallel with the normal (n) of the light directing surface 109. FIG. 7c shows an example where the line of sight of the light directing surface 109 is indicated with lower dashed line 137 corresponding a normal (n) to the surface 109, and upper dashed line 137'. Having a free line of sight 137, 137', i.e. no obstruction or intersection of the described sight lines 137, 137', by the frame element 113 allows for optimizing subsequent surface treatment processes of the light directing surface 109, such as sand blasting. Obtaining the desired characteristics of the light directing surface 109 may thus be facilitated. The frame element 113 may comprise a sloped portion 138, as schematically indicated in FIG. 7c, which allows for obtaining a free line of sight 137, 137', of the light directing surface 109 as described above, while maintaining a compact profile of the frame element 113. The sloped portion 138 may be arranged so that the lower sight line 137, corresponding to the intersection point of a normal (n) with the surface 109 at a lower endpoint 139 of the surface 109 (closest to the wall portion 127), may be extended beyond the frame element 113 without intersecting with the frame element 113 or the sloped portion 138, as illustrated in the example of FIG. 7*c*. This provides for a facilitated access for surface treatment of the entire light directing surface 109 while maintaining a particularly compact frame element 113. The wall portion 127 may be part of the sloped portion 138.

Figure 10B:
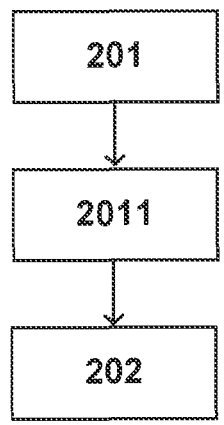
FIG. 10b is another flow-chart of a method of manufacturing a frame element for a touch sensing apparatus, according to one example of the disclosure.
Figure 10C:
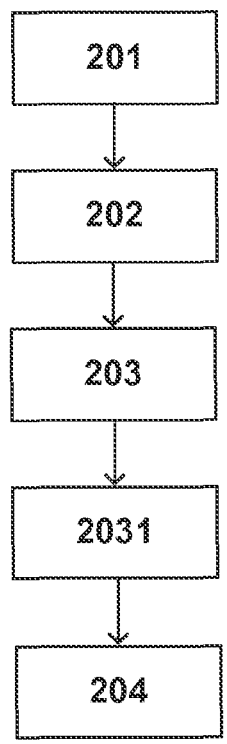
FIG. 10c is another flow-chart of a method of manufacturing a frame element for a touch sensing apparatus, according to one example of the disclosure.

FIGS. 10*b-c* are further flowcharts of a method 200. The method 200 may comprise etching, or bead- or sand blasting 2011, 2031, the light directing surface 109. The light directing surface 109 may thus be provided with different reflectance characteristics. In one example the etching, or bead- or sand blasting 2011 the light directing surface 109 is performed before milling 202, as indicated in FIG. 10*b*. The light directing surface 109 may thus be provided with different reflectance characteristics without affecting the surfaces 115*a*, 115*b*, of the channel 112, which are shielded by the wall portion 127, e.g. during an sand blasting process. As mentioned above, it may be advantageous to maintain a larger specular reflection component of the walls 115*a*, 115*b*, as provided after the extrusion process, while the light directing surface 109 may be subsequently treated to provide more diffusive reflection. In some examples, the etching, or bead- or sand blasting 2031 the light directing surface 109 may be performed after said milling 202, as indicated in FIG. 10*c*. In some examples, the etching, or bead- or sand blasting 2031 the light directing surface 109 may be performed after an additional milling step 203 described below, as further indicated in FIG. 10*c*. The method 200 may comprise anodization 204 of the metal of the frame element 113, as described above.

Figure 8A:
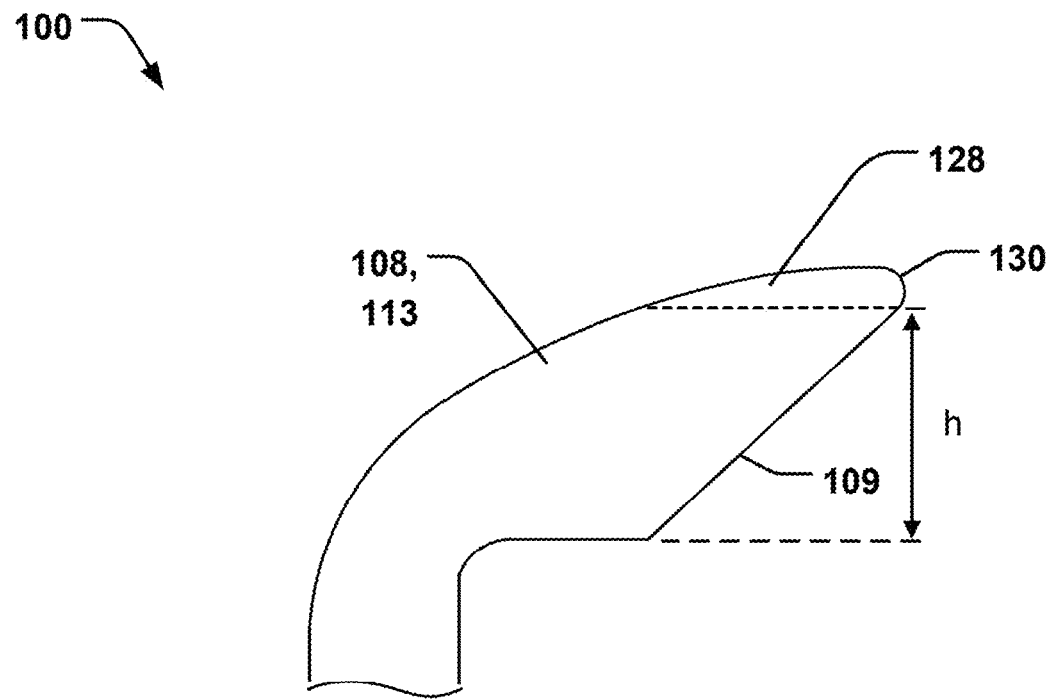
FIGS. 8a-b are schematic illustrations, in a cross-sectional side views, of a detail of a frame element for a touch-sensing apparatus, according to examples of the disclosure.
Figure 8B:
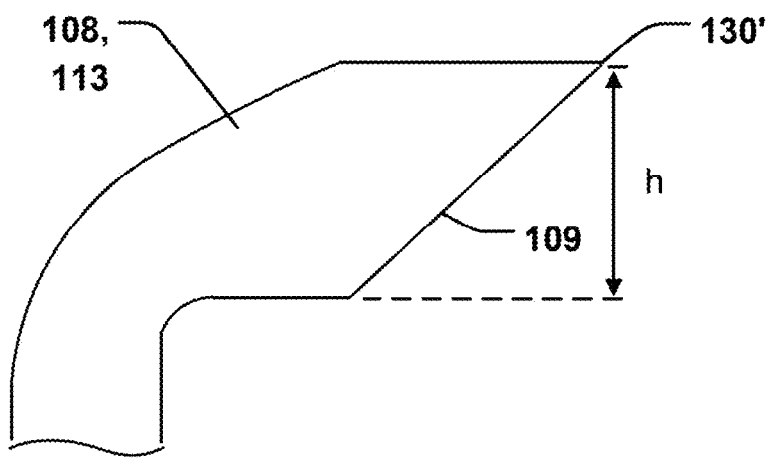

The method 200 may comprise milling 203 a top portion 128 of the extruded light directing portion 108 so that a height (h) of the light directing portion 109 above a touch surface 102 of a panel 101, when arranged in the frame element 113, is reduced. FIG. 8*a* shows a detailed view of an example of the light directing portion 108 after extrusion. The radius of tip 130 of the top portion 128 is limited by the extrusion process. FIG. 8*b* show the light directing portion 108 after the top portion 128 has been milled away along the dashed line in FIG. 8*a*. The milled light directing portion 108 has a height (h) and the corresponding tip 130', as indicated in FIG. 8*b*, is sharper, i.e. the radius is reduced compared to the tip 130 provided after the extrusion. Thus, a more compact light directing portion 108 has been provided, by milling away the top portion 128, while the portion of the light directing portion 108 which is useful for reflecting the light across the touch surface 102 is essentially unaffected. The rounded tip 130 in FIG. 8*a* is not useful for directing the light across the touch surface 102. The round tip 130 has thus been removed as illustrated in FIG. 8*b*. Milling the top portion 128 thus provides for a more effective utilization of the height of the light directing portion 108. A sufficient height, or height distribution, of the scanline above the touch surface 102 may thus be provided, to allow for secure identification of different touch objects with different tip sizes, while minimizing the bezel height. In some examples, the height is in the range 1.5-2 mm. A height of 1.8 mm may in some examples be particularly advantageous, providing the appearance of a flush bezel.

Figure 8C:
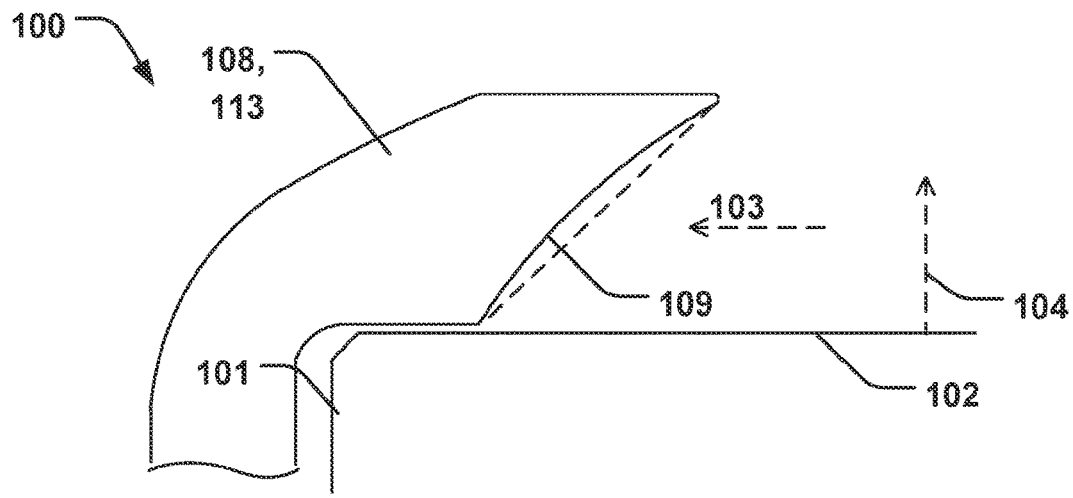
FIG. 8c is a schematic illustration, in a cross-sectional side views, of a detail of a frame element for a touch-sensing apparatus, according to one example of the disclosure.

The light directing surface 109 may be concave as schematically illustrated in FIG. 8*c*. Having a light directing surface 109 which is concave towards the touch surface 102 provides for controlling the direction of the reflected light as desired and increasing the signal strength of the scanlines.

The light directing surface 109 may be parabolic concave. Since the light directing surface 109 may be formed directly in the frame element 113, as described above, the concave shape may be shaped directly in the frame element 113. Thus, the light reflection may be controlled by shaping the frame element directly 113, without having to introduce any additional optical component.

Figure 8D:
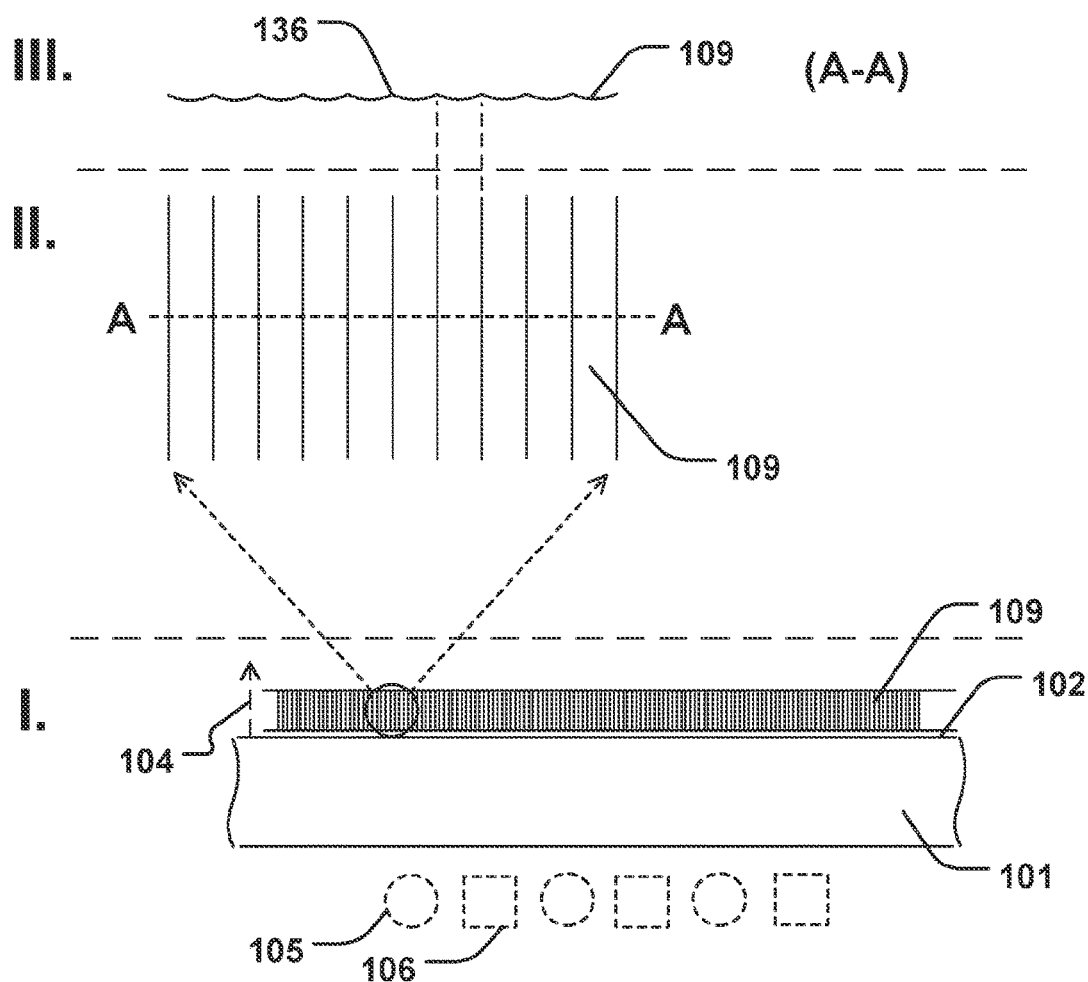
FIG. 8d are schematic illustrations of a detail of a frame element comprising a light directing surface, for a touch-sensing apparatus, in a view along the direction of a plane of a touch surface (I); a detailed section of the light directing surface (II), from the view in (I); and a side-view (III) of the section in (II), according to examples of the disclosure.

FIG. 8*d* are schematic illustrations of a detail the light directing surface 109, in different views I-III. The first view (I) is along the direction 103 of the plane 103, e.g. along arrow 103 in FIG. 8*c*. The light directing surface 109 is thus illustrated as an elongated portion, arranged above the panel 101, and the emitters 105 and detectors 106 below the panel 101. FIG. 8*d* shows in the second view (II) a detailed section of the light directing surface 109. The light directing surface 109 may be milled or otherwise machined to form a pattern in the surface 109. The third view (III) of FIG. 8*d* is a cross-section along A-A in view (II), where an example of such pattern is shown, with periodic ridges 136 forming an undulating pattern or grating. Different patterns may be formed directly in the frame element 113 by milling or other machining processes, to provide a light directing surface 109 with desired reflective characteristics to control the direction of the light across the touch surface 102.

Further examples of diffusive light scattering surfaces are described in the following. Any of the diffusive light scattering surfaces described may be provided on the light directing surface 109. The diffusive light scattering surface may be configured to exhibit at least 50% diffuse reflection, and preferably at least 70-85% diffuse reflection. Reflectivity at 940 nm above 70% may be achieved for materials with e.g. black appearance, by anodization as mentioned above (electrolytic coloring using metal salts, for example). A diffusive light scattering surface may be implemented as a coating, layer or film applied by e.g. by anodization, painting, spraying, lamination, gluing, etc. Etching and blasting as mentioned above is an effective procedure for reaching the desired diffusive reflectivity. In one example, the diffusive light scattering surface is implemented as matte white paint or ink. In order to achieve a high diffuse reflectivity, it may be preferable for the paint/ink to contain pigments with high refractive index. One such pigment is $TiO_2$, which has a refractive index n=2.8. The diffusive light scattering surface may comprise a material of varying refractive index. It may also be desirable, e.g. to reduce Fresnel losses, for the refractive index of the paint filler and/or the paint vehicle to match the refractive index of the material on which surface it is applied. The properties of the paint may be further improved by use of EVOQUE™ Pre-Composite Polymer Technology provided by the Dow Chemical Company. There are many other coating materials for use as a diffuser that are commercially available, e.g. the fluoropolymer Spectralon, polyurethane enamel, barium-sulphate-based paints or solutions, granular PTFE, microporous polyester, GORE® Diffuse Reflector Product, Makrofol® polycarbonate films provided by the company Bayer AG, etc. Alternatively, the diffusive light scattering surface may be implemented as a flat or sheet-like device, e.g. the above-mentioned engineered diffuser, diffuser film, or white paper which is attached by e.g. an adhesive. According to other alternatives, the diffusive light scattering surface may be implemented as a semi-randomized (non-periodic) microstructure on an external surface possibly in combination with an overlying coating of reflective material.

A micro-structure may be provided on such external surface and/or an internal surface by etching, embossing, molding, abrasive blasting, scratching, brushing etc. The diffusive light scattering surface may comprise pockets of air along such internal surface that may be formed during a molding procedure. In another alternative, the diffusive light scattering surface may be light transmissive (e.g. a light transmissive diffusing material or a light transmissive engineered diffuser) and covered with a coating of reflective material at an exterior surface. Another example of a diffusive light scattering surface is a reflective coating provided on a rough surface.

The diffusive light scattering surface may comprise lenticular lenses or diffraction grating structures. Lenticular lens structures may be incorporated into a film. The diffusive light scattering surface may comprise various periodical structures, such as sinusoidal corrugations provided onto internal surfaces and/or external surfaces. The period length may be in the range of between 0.1 mm-1 mm. The periodical structure can be aligned to achieve scattering in the desired direction.

Hence, as described, the diffusive light scattering surface may comprise; white- or colored paint, white- or colored paper, Spectralon, a light transmissive diffusing material covered by a reflective material, diffusive polymer or metal, an engineered diffuser, a reflective semi-random microstructure, in-molded air pockets or film of diffusive material, different engineered films including e.g. lenticular lenses, or other micro lens structures or grating structures. The diffusive light scattering surface preferably has low NIR absorption.

In a variation of any of the above embodiments wherein the diffusive light scattering element provides a reflector surface, the diffusive light scattering element may be provided with no or insignificant specular component. This may be achieved by using either a matte diffuser film in air, an internal reflective bulk diffusor or a bulk transmissive diffusor. This allows effective scanline broadening by avoiding the narrow, super-imposed specular scanline usually resulting from a diffusor interface having a specular component, and providing only a broad, diffused scanline profile. By removing the super-imposed specular scanline from the touch signal, the system can more easily use the broad, diffused scanline profile. Preferably, the diffusive light scattering surface has a specular component of less than 1%, and even more preferably, less than 0.1%. Alternatively, where the specular component is greater than 0.1%, the diffusive light scattering element is preferably configured with surface roughness to reduce glossiness, e.g. micro structured.

The panel 101 may be made of glass, poly(methyl methacrylate) (PMMA) or polycarbonates (PC). The panel 101 may be designed to be overlaid on or integrated into a display device or monitor (not shown). It is conceivable that the panel 101 does not need to be light transmissive, i.e. in case the output of the touch does not need to be presented through panel 101, via the mentioned display device, but instead displayed on another external display or communicated to any other device, processor, memory etc. The panel 101 may be provided with a shielding layer such as a print, i.e. a cover with an ink, to block unwanted ambient light. The amount of stray light and ambient light that reaches the detectors 106 may thus be reduced.

As used herein, the emitters 105 may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitter 105 may also be formed by the end of an optical fiber. The emitters 105 may generate light in any wavelength range. The following examples presume that the light is generated in the infrared (IR), i.e. at wavelengths above about 750 nm. Analogously, the detectors 106 may be any device capable of converting light (in the same wavelength range) into an electrical signal, such as a photo-detector, a CCD device, a CMOS device, etc.

With respect to the discussion above, "diffuse reflection" refers to reflection of light from a surface such that an incident ray is reflected at many angles rather than at just one angle as in "specular reflection". Thus, a diffusively reflecting element will, when illuminated, emit light by reflection over a large solid angle at each location on the element. The diffuse reflection is also known as "scattering". The described examples refer primarily to aforementioned elements in relation to the emitters 105, to make the presentation clear, although it should be understood that the corresponding arrangements may also apply to the detectors 106.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, the specific arrangement of emitters and detectors as illustrated and discussed in the foregoing is merely given as an example. The inventive coupling structure is useful in any touch-sensing system that operates by transmitting light, generated by a number of emitters, across a panel and detecting, at a number of detectors, a change in the received light caused by an interaction with the transmitted light at the point of touch.

The invention claimed is:

1. A touch sensing apparatus comprising:
   a panel that defines a touch surface extending in a plane having a normal axis,
   a plurality of emitters and detectors arranged along a perimeter of the panel, and
   a light directing portion arranged adjacent the perimeter and comprising a light directing surface,
   wherein the emitters are arranged to emit light and the light directing surface is arranged to receive the light and direct the light across the touch surface,
   wherein the panel comprises a rear surface, opposite the touch surface, and the emitters and/or the detectors are arranged in a cavity of a frame element and arranged opposite the rear surface to emit and/or receive light through a channel in a wall portion of the cavity, the channel is arranged opposite the rear surface and extends in a direction of the normal axis,
   wherein the light directing surface and the channel are arranged on opposite sides of the panel and overlap in the direction of the plane, and
   whereby the light directing surface receives light from the emitters, or directs light to the detectors, through the panel and through the channel, in the direction of the normal axis.

2. The touch sensing apparatus according to claim 1, wherein an angle (v) between the light directing surface and the plane of the touch surface is less than 45 degrees, or above 45 degrees.

3. The touch sensing apparatus according to claim 1, the panel having edges extending between the touch surface and the rear surface,
   the channel extending in a direction parallel with the plane with a width ($d_1$) between a first channel wall, arranged closest to a respective edge of the panel, and an opposite second channel wall, wherein the first channel wall extends with an angle towards the direction of the normal axis.

4. The touch sensing apparatus according to claim 1, wherein the light directing surface extends from an edge portion of the light directing portion being arranged closest to the touch surface to a protrusion of the light directing portion, the protrusion extending in a direction parallel with the plane to shield ambient or stray light from being reflected towards the channel.

5. The touch sensing apparatus according to claim 1, wherein the emitters and/or detectors are mounted to a substrate, the substrate comprising a chamfered edge to be arranged opposite a corresponding mating surface of the frame element forming an angle with the normal axis.

6. The touch sensing apparatus according to claim 1, wherein walls of the channel comprise a diffusive light scattering surface.

7. The touch sensing apparatus according to claim 1, wherein the emitters and/or detectors are mounted to a substrate,
wherein a support is attached to the substrate, the support extending in a direction parallel with the plane between the substrate and a frame wall of the frame element.

8. The touch sensing apparatus according to claim 1, wherein the light directing surface is etched metal, sand blasted metal, bead blasted metal, or brushed metal for increasing surface roughness and to diffusively reflect the light over the touch surface.

9. The touch sensing apparatus according to claim 1, wherein the light directing surface has a surface roughness defined by a slope RMS ($\Delta q$) between 0-0.1.

10. The touch sensing apparatus according to claim 1, wherein the light directing portion comprises an outer surface opposite the light directing surface, wherein the light directing surface has a higher reflectance than the outer surface.

11. The touch sensing apparatus according to claim 1, wherein walls of the channel have a higher specular reflectance than the light directing surface.

12. The touch sensing apparatus according to claim 1, wherein the panel having edges extending between the touch surface and the rear surface,
wherein the emitters and/or detectors are mounted to a substrate and the substrate is arranged in the cavity so that the emitters and/or detectors are arranged closer to the respective edge of the panel than the substrate.

13. The touch sensing apparatus according to claim 12, wherein the cavity extends in a direction parallel with the plane with a width ($d_2$) between a first frame wall, arranged closest to the respective edge of the panel, and an opposite second frame wall,
wherein the substrate is arranged in the cavity so that the emitters and/or detectors are arranged closer to the first frame wall than the substrate.

14. The touch sensing apparatus according to claim 12, wherein the substrate extends with an elongated shape in a direction of the normal axis.

15. The touch sensing apparatus according to claim 1, wherein the light directing surface has a surface roughness defined by a slope RMS ($\Delta q$) between 0.1-0.25.

16. The touch sensing apparatus according to claim 15, wherein the light directing surface has a surface roughness defined by a slope RMS ($\Delta q$) between 0.13-0.20.

17. The touch sensing apparatus according to claim 1, wherein the light directing surface is anodized metal.

18. The touch sensing apparatus according to claim 17, wherein the frame element comprises the light directing portion, wherein the frame element is formed from said metal,
whereby the light directing surface is an anodized metal surface of the frame element, and/or an etched metal surface, sand blasted metal surface, bead blasted metal surface, or brushed metal surface of the frame element.

19. The touch sensing apparatus according to claim 18, wherein the metal surface is concave towards the touch surface.

20. A touch sensing apparatus comprising:
a panel that defines a touch surface extending in a plane having a normal axis,
a plurality of emitters and detectors arranged along a perimeter of the panel,
a light directing portion arranged adjacent the perimeter and comprising a light directing surface,
wherein the emitters are arranged to emit light and the light directing surface is arranged to receive the light and direct the light across the touch surface,
the panel comprises a rear surface, opposite the touch surface,
the emitters and/or the detectors are arranged in a cavity of a frame element and arranged opposite the rear surface to emit and/or receive light through a channel in a wall portion of the cavity, and
the light directing surface receives light from the emitters, or directs light to the detectors, through the panel and through the channel, wherein the frame element is formed from a metal and comprises the light directing portion, and the light directing surface is an anodized metal surface of the frame element.

21. A method of manufacturing a frame element for a touch sensing apparatus, comprising:
extruding the frame element to form a light directing portion and a cavity adapted to receive a substrate comprising emitters and/or detectors, and
milling a wall portion of the cavity to form a channel so that, in use, a light directing surface of the light directing portion receives light from the emitters, or directs light to the detectors, through the channel.

22. The method according to claim 21, comprising etching, or bead- or sand blasting the light directing surface.

23. The method according to claim 21, comprising milling a top portion of the extruded light directing portion so that a height (h) of the light directing portion above a touch surface of a panel, when arranged in the frame element, is reduced.

* * * * *